United States Patent
Kamiya

(10) Patent No.: US 10,523,283 B2
(45) Date of Patent: Dec. 31, 2019

(54) LOS-MIMO DEMODULATION APPARATUS, COMMUNICATION APPARATUS, LOS-MIMO TRANSMISSION SYSTEM, LOS-MIMO DEMODULATION METHOD AND PROGRAM

(71) Applicant: NEC Corporation, Minato-ku, Tokyo (JP)

(72) Inventor: Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/081,076

(22) PCT Filed: Apr. 18, 2017

(86) PCT No.: PCT/JP2017/015562
§ 371 (c)(1),
(2) Date: Aug. 30, 2018

(87) PCT Pub. No.: WO2017/183631
PCT Pub. Date: Oct. 26, 2017

(65) Prior Publication Data
US 2019/0020384 A1    Jan. 17, 2019

(30) Foreign Application Priority Data

Apr. 19, 2016 (JP) .................. 2016-083552

(51) Int. Cl.
*H04L 27/01* (2006.01)
*H04B 7/005* (2006.01)
(Continued)

(52) U.S. Cl.
CPC .......... *H04B 7/0413* (2013.01); *H04B 7/005* (2013.01); *H04B 7/0854* (2013.01); *H04L 27/01* (2013.01); *H04L 27/38* (2013.01)

(58) Field of Classification Search
CPC .... H04B 7/0413; H04B 7/005; H04B 7/0854; H04B 7/0417; H04B 7/0669; H04L 27/01;
(Continued)

(56) References Cited

U.S. PATENT DOCUMENTS

| 8,488,696 B2 | 7/2013 | Ishihara et al. |
| 8,787,478 B2 | 7/2014 | Sasaki |

(Continued)

FOREIGN PATENT DOCUMENTS

| JP | 2005-252602 A | 9/2005 |
| JP | 2006-197132 A | 7/2006 |

(Continued)

OTHER PUBLICATIONS

P.F. Driessen et al., "On the Capacity Formula for Multiple Input-Multiple Output Wireless Channels: A Geometric Interpretation", Transactions Letters, IEEE Transactions on Communications, Feb. 1999, vol. 47, No. 2, pp. 173-176.

(Continued)

*Primary Examiner* — Ted M Wang

(57) ABSTRACT

A LOS-MIMO demodulation apparatus comprises a plurality of receive antennas that receive data; a phase noise estimation part that calculates, from each signal received, first phase noise information and second phase noise information relating to phase noise occurring at transmit antennas and the receive antennas; a first correction part that corrects a phase of each signal received by the plurality of receive antennas according to the first phase noise information; a frequency domain equalization part that performs frequency domain equalization processing compensating for distortion due to interference from each signal received; a second correction part that corrects, according to the second phase noise information, a phase of each signal obtained by (Continued)

returning the signals, on which the frequency domain equalization processing has been performed, to the time domain by performing an inverse discrete Fourier transform; and a decoding processing part that performs decoding processing on the corrected data.

20 Claims, 13 Drawing Sheets

(51) Int. Cl.
*H04B 7/0413* (2017.01)
*H04L 27/38* (2006.01)
*H04B 7/08* (2006.01)

(58) Field of Classification Search
CPC ..... H04L 27/38; H04L 27/033; H04L 1/0618; H04L 1/06; H04L 25/0204
See application file for complete search history.

(56) References Cited

U.S. PATENT DOCUMENTS

| | | | |
|---|---|---|---|
| 8,805,282 B2 | 8/2014 | Kawai | |
| 9,136,979 B2 | 9/2015 | Kamiya et al. | |
| 2010/0015922 A1 | 1/2010 | Kawai | |
| 2010/0290552 A1 | 11/2010 | Sasaki | |
| 2011/0129041 A1 | 6/2011 | Ishihara et al. | |
| 2012/0033965 A1* | 2/2012 | Zhang | H04B 10/611 398/38 |
| 2013/0309976 A1* | 11/2013 | Koren | H04B 7/0854 455/63.4 |
| 2015/0085960 A1 | 3/2015 | Kamiya et al. | |
| 2015/0270993 A1* | 9/2015 | Cheung | H04L 25/03159 375/232 |

FOREIGN PATENT DOCUMENTS

| | | |
|---|---|---|
| JP | 2010-119070 A | 5/2010 |
| JP | 2011-97459 A | 5/2011 |
| JP | 5317021 B2 | 10/2013 |
| JP | 5322274 B2 | 10/2013 |
| WO | 2009/154278 A1 | 12/2009 |
| WO | 2013/161801 A1 | 10/2013 |

OTHER PUBLICATIONS

Sarris et al., "Maximum MIMO Capacity in Line-of-Sight", IEEE International Conference on Information, Communications and Signal Processing (ICICS), Proceedings, Dec. 2005, pp. 1236-1240, total 5 pages.
Ingason et al., "Impact of Frequency Selective Channels on a Line-of-Sight MIMO Microwave Radio Link", IEEE Vehicular Technology Conference (VTC), Proceedings, May 2010, total 5 pages.
Rui LV et al., "Phase Noise Suppression for Realistic LOS-MIMO Microwave Backhaul Systems", IEEE, 2013 Asia-Pacific Microwave Conference Proceedings, 2013, pp. 794-796 (total 5 pages).
International Search Report dated Jul. 4, 2017, issued by the International Searching Authority in application No. PCT/JP2017/015562.

* cited by examiner

LOS-MIMO DEMODULATION APPARATUS, COMMUNICATION APPARATUS, LOS-MIMO TRANSMISSION SYSTEM, LOS-MIMO DEMODULATION METHOD AND PROGRAM

CROSS-REFERENCE TO RELATED APPLICATIONS

The present invention is based upon and claims the benefit of the priority of Japanese patent application No. 2016-083552 filed on Apr. 19, 2016, the disclosure of which is incorporated herein in its entirety by reference thereto.

The present invention relates to a demodulation apparatus, communication apparatus, LOS-MIMO transmission system, LOS-MIMO demodulation method and program used in a multiple-input multiple-output (MIMO) wireless communication system, and particularly to a demodulation apparatus, communication apparatus, LOS-MIMO transmission system, LOS-MIMO demodulation method and program used in a line-of-sight (LOS) MIMO wireless communication system using microwave and millimeter wave bands.

BACKGROUND

Microwave/millimeter wave band communication system is a LOS communication system in which a transmitting/receiving station is physically fixed, and demand for it as mobile communication infrastructure is dramatically increasing in recent years. As a result, an increase in mobile communication traffic calls for larger transmission capacity. Means for increasing transmission capacity to address such demand include the use of polarization multiplexing, increasing modulation levels, or bandwidth expansion, however, utilizing all of these means will still not deal with the anticipated increase in traffic sufficiently, and in addition to these, the development of a technology that is able to further increase the communication capacity is expected.

As such a technology, the MIMO transmission system using a plurality of transmit/receive antennas has attracted attention. This technology has hitherto been developed mainly for applications to non-line-of-sight mobile communication systems such as mobile phones or wireless LANs (Local Area Networks), however, more recently, applications to line-of-sight fixed wireless communication systems using micro- and millimeter waves have been considered and it has gained attention as a technology that addresses the demand for larger capacity caused by the increase in traffic.

Non-Patent Literature (NPL) 1 discloses the principle of MIMO (referred to as "LOS-MIMO" hereinafter) transmission in line-of-sight fixed wireless communication. Non-Patent Literatures 1 and 2 show that the difference in transmission delay is adjusted by appropriately positioning a plurality of transmit and receive antennas, and the amount of the phase rotation of the carrier caused by the adjusted difference in transmission delay contributes to the improvement of the signal-to-noise ratio, increasing the communication capacity. For instance, in a case where two transmit antennas and two receive antennas are provided, the communication capacity is expected to increase twofold, compared with ordinary single-input single-output (SISO) transmission having one transmit antenna and one receive antenna. Such line-of-sight MIMO communication is distinguished from the non-line-of-sight MIMO (referred to as "NLOS-MIMO" hereinafter) communication in mobile communication or wireless LAN actively and effectively utilizing a multiplex transmission wave in which many signals overlap and vary over time due to the reflection, diffraction, and disturbance of radio waves.

Non-Patent Literature 3 describes a LOS-MIMO demodulation method in which signal separation means related to 2×2 LOS-MIMO having two transmit antennas and two receive antennas is integrated with a time domain equalizer that compensates for inter-symbol interference caused by fading.

Patent Literatures 1 and 2 describe means for realizing LOS-MIMO communication in line-of-sight fixed wireless communication systems utilizing a microwave or millimeter wave band. In the configurations in these documents, means for separating and extracting a desired signal from received signals multiplexed by LOS-MIMO transmission and ordinary demodulation means in SISO transmission conventionally using a single transmit antenna and a single receive antenna are deployed in tandem. The signal separating/extracting means related to LOS-MIMO is realized by estimating parameters representing a LOS-MIMO transmission path model by transmitting a pilot signal sequence comprising several symbols that form orthogonal patterns and by performing reverse conversion of multiplexing that has occurred in the MIMO transmission path with signal processing.

In addition, documents that constitute background art include Patent Literatures 3 and 4. How they relate to the present invention will be described later.

[PTL 1]
Japanese Patent No. 5317021B
[PTL 2]
Japanese Patent No. 5322274B
[PTL 3]
International Publication No. WO2013/161801A1
[PTL 4]
Japanese Patent Kokai Publication No. JP2010-119070A
[NPL 1]
P. F. Driessen and G. J. Foschini, "On the Capacity Formula for Multiple Input—Multiple Output Wireless Channels: A Geometric Interpretation," IEEE Transactions on Communications, Vol. 47, No. 2, pp. 173-176, February 1999.
[NPL 2]
I. Sarris and A. R. Niz, "Maximum MIMO Capacity in Line-of-Sight," IEEE International Conference on Information, Communications and Signal Processing (ICICS), Proceedings, pp. 1236-1240, December 2005.
[NPL 3]
T. Ingason, H. Liu, M. Coldrey, A. Wolfgang, and J. Hansryd, "Impact of Frequency Selective Channels on a Line-of-Sight MIMO Microwave Radio Link," IEEE Vehicular Technology Conference (VTC), Proceedings, May 2010.

SUMMARY

The following analysis is given by the present invention. As described above, in line-of-sight fixed wireless communication using a microwave or millimeter wave band (referred to as "microwave/millimeter wave band" hereinafter when microwave and millimeter wave are not particularly distinguished), super multi-level transmission utilizing a signal multi-level number of 1024 or more has been used in order to increase the communication capacity. Therefore, to achieve a larger capacity, the LOS-MIMO transmission technology must be able to be applied along with such super multi-level modulation. When LOS-MIMO transmission is performed in fixed wireless communication using a microwave/millimeter wave band, however, one naturally assumes that phase noise that accompanies each antenna is independent for each antenna due to restrictions on each interval between transmit antennas (and receive antennas) and this independent phase noise will significantly degrade the communication quality of the LOS-MIMO transmission. In addition to such deterioration caused by phase noise, main factors that degrade the quality of received signals include interference caused by signal multiplexing in the LOS-MIMO transmission and inter-symbol interference caused by fading.

When the signal quality degradation caused by phase noise is compensated for in the configurations of Patent Literatures 1 and 2, changes in the channel characteristics over time must be followed by more frequently transmitting the pilot signal sequences comprising several known symbols that form orthogonal patterns. This, however, will significantly limit the increase in the communication capacity, our original purpose, and is not an appropriate solution.

The method of Non-Patent Literature 3 does not require the pilot signal sequences comprising several known symbols that form orthogonal patterns; it simply requires pilot signal sequences comprising known signals and performs demodulation by controlling signal processing related to LOS-MIMO and the tap coefficient of the time domain equalizer for compensating for inter-symbol interference using an error signal after interference cancellation processing. As for phase noise, for instance, it is possible to employ the method of Patent Literature 3, however, this is a technology for SISO transmission and has limited effects in terms of compensating for the phase noise independently occurring at each transmit/receive antenna in LOS-MIMO transmission. As a result, this method will require numerous control signals, compared with a case of SISO transmission.

Further, the amount of the time domain equalizers the method of Non-Patent Literature 3 requires is four times as many as in a case of SISO transmission; therefore, increases in the calculation amount and equipment scale will pose a problem. This increase is caused by the doubled number of transmit/receive antennas, which results in twice as many transmission paths, and it becomes necessary to eliminate not only the inter-symbol interference, but also interference caused by signal multiplexing in MIMO transmission. Further, the number of equalizers will be 16 times as many in a case that applies polarization multiplexed transmission utilizing a vertically or horizontally polarized wave, emphasizing the problem of the implementation cost.

Generally speaking, it is a known fact that, in order to reduce the cost of implementing equalizers, frequency domain equalization is more effective than time domain equalization. Since single carrier transmission is widely used in line-of-sight fixed wireless communication using a microwave or millimeter wave band, single carrier frequency domain equalization is applied, however, it is necessary to have redundant data such as a training block or cyclic prefix for channel estimation, the amount of which should correspond to the number of transmission paths in the LOS-MIMO transmission. The amount of such redundant data must be kept to a minimum to reduce the impact on communication capacity decreases, however, this adversely affects the transmission quality. For instance, a method described in Patent Literature 4 is related to single carrier frequency equalization and phase noise compensation, however, this technology is for SISO transmission and the effects in LOS-MIMO transmission are limited.

As described, in line-of-sight fixed wireless MIMO transmission using a microwave or millimeter wave band, all of the following must be done with high accuracy while avoiding a decrease in the transmission capacity and a significant increase in the implementation cost: canceling the interference caused by signal multiplexing and the inter-symbol interference caused by fading, and compensating for the independent phase noise at each antenna.

When LOS-MIMO single carrier transmission in a fixed wireless system using a microwave or millimeter wave band suffers from inter-symbol interference caused by fading and the degradation of the transmission quality caused by independent phase noise at each antenna, in addition to interference accompanying signal multiplexing in MIMO transmission, the LOS-MIMO demodulation method described above as background art is unable to avoid an increase in the calculation cost required to compensate for the deterioration and a decrease in the communication capacity due to an increased number of control signals (training sequences, pilot signals), negating the benefit of implementing the LOS-MIMO transmission technology.

It is an object of the present invention to provide a demodulation apparatus and demodulation method that contribute to providing a configuration capable of high-capacity and high-quality data transmission in LOS-MIMO transmission even in a transmission environment having inter-symbol interference caused by fading, in addition to independent phase noise for each polarized wave and each antenna.

According to a first aspect, there is provided a LOS-MIMO demodulation apparatus comprising a plurality of receive antennas that receive data transmitted with line-of-sight multiple-input multiple-output (LOS-MIMO). The LOS-MIMO demodulation apparatus further comprises a phase noise estimation part that calculates, from each signal received by the plurality of receive antennas, first phase noise information and second phase noise information relating to phase noise occurring at transmit antennas and the receive antennas. The LOS-MIMO demodulation apparatus further comprises a first correction part that corrects a phase of each signal received by the plurality of receive antennas according to the first phase noise information. The LOS-MIMO demodulation apparatus further comprises a frequency domain equalization part that performs frequency domain equalization processing compensating for distortion due to interference from each signal received by the plurality of receive antennas on the corrected received signal. The LOS-MIMO demodulation apparatus further comprises a second correction part that corrects, according to the second phase noise information, a phase of each signal obtained by returning the signals, on which the frequency domain equalization processing has been performed, to the time domain by performing an inverse discrete Fourier transform. The LOS-MIMO demodulation apparatus further comprises a decoding processing part that performs decoding processing on the corrected data.

According to a second aspect, there is provided a communication apparatus including the LOS-MIMO demodulation apparatus described above.

According to a third aspect, there is provided a LOS-MIMO transmission system comprising a function of feeding the second phase noise information calculated by the LOS-MIMO demodulation apparatus described above back to the transmission side, and having the transmission side transmit each of signals transmitted from the plurality of transmit antennas after having performed phase rotation processing on the signals using the second phase noise information.

According to a fourth aspect, there is provided a line-of-sight multiple-input multiple-output (LOS-MIMO) demodulation method including calculating, from each signal received by a plurality of receive antennas of a LOS-MIMO demodulation apparatus constituting LOS-MIMO, first phase noise information and second phase noise information relating to phase noise occurring at the transmit antennas and the receive antennas; correcting a phase of each signal received by the plurality of receive antennas according to the first phase noise information; performing frequency domain equalization processing, using the tap coefficients, compensating for distortion due to interference from each of the received signals on signals obtained by converting each of the corrected received signals into the frequency domain by means of a discrete Fourier transform of length N; and correcting, according to the second phase noise information, a phase of each signal obtained by returning the signals, on which the frequency domain equalization processing has been performed, to the time domain by performing an inverse discrete Fourier transform. The present method is tied to a particular machine, namely, the LOS-MIMO demodulation apparatus.

According to a fifth aspect, there is provided a computer program for realizing the functions of the LOS-MIMO demodulation apparatus described above. Further, this program can be stored in a computer-readable (non-transient) storage medium. In other words, the present invention can be realized as a computer program product.

The meritorious effects of the present invention are summarized as follows.
According to the present invention, high-capacity and high-quality data transmission is possible in LOS-MIMO transmission even in a transmission environment having inter-symbol interference caused by fading, in addition to independent phase noise for each antenna and each polarized wave. In other words, the present invention transforms the LOS-MIMO transmission systems described in Background into LOS-MIMO transmission systems capable of high-capacity and high-quality data transmission.
Namely, the present invention can transform a LOS-MIMO demodulation apparatus into a LOS-MIMO demodulation apparatus that can perform high-capacity and high-quality data transmission.

PREFERRED MODES

Figure 1:
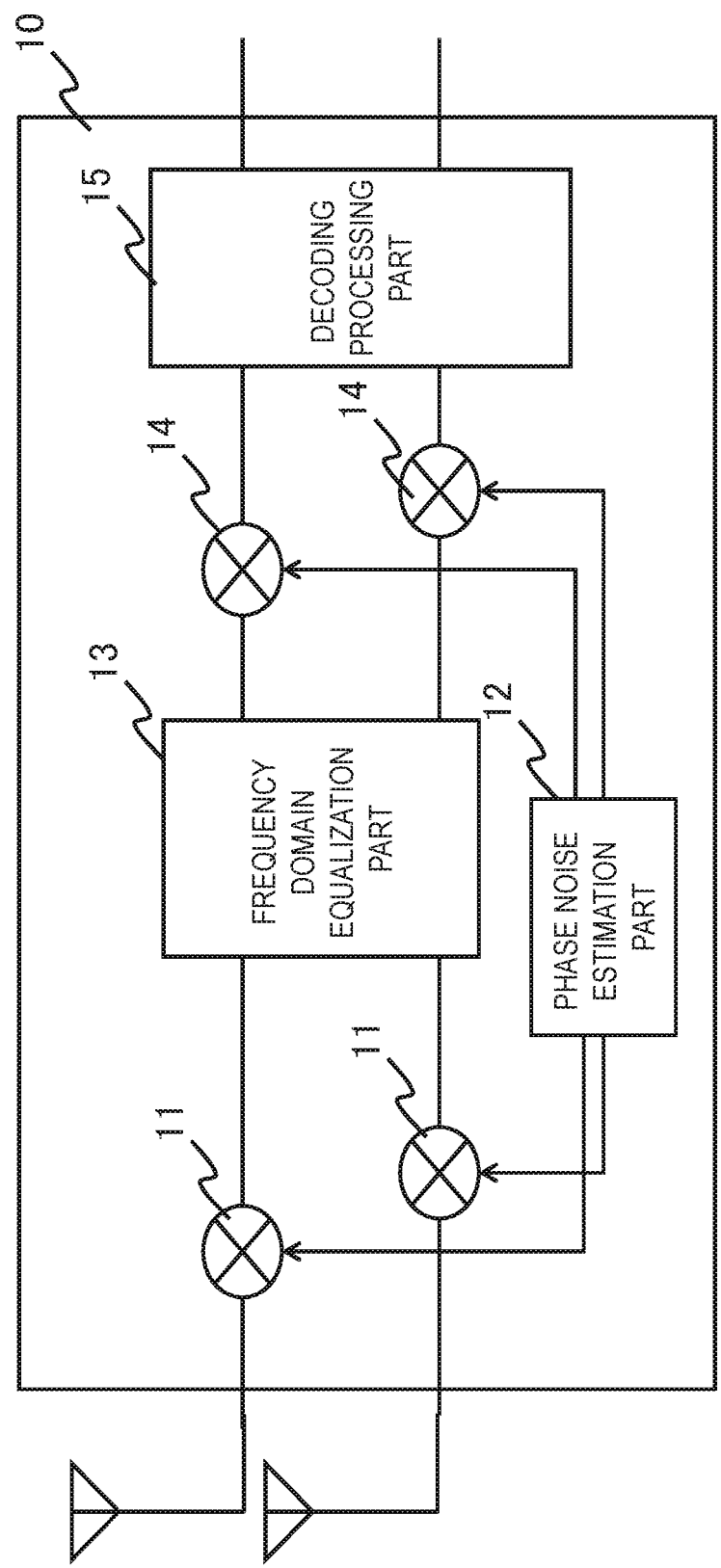
FIG. 1 is a drawing illustrating the configuration of an exemplary embodiment of the present disclosure.

First, an outline of an exemplary embodiment will be described with reference to the drawings. Note that drawing reference signs in the outline are given to each element as an example solely to facilitate understanding for convenience and are not intended to limit the present disclosure to the aspects shown in the drawings. Further, connection lines between blocks in the drawings used in the description below can be both bidirectional and unidirectional. Unidirectional arrows schematically indicate main flows of signals (data) and do not exclude bidirectionality.

The present disclosure in an exemplary embodiment thereof can be realized by a configuration (a LOS-MIMO demodulation apparatus 10) comprising a plurality of receive antennas that receive data transmitted with LOS-MIMO, a phase noise estimation part 12, a first correction part 11, a frequency domain equalization part 13 that performs frequency domain equalization processing compensating for distortion due to interference from each signal received by the plurality of receive antennas, a second correction part 14, and a decoding processing part 15 that performs decoding processing on the corrected data, as shown in FIG. 1.

More specifically, the phase noise estimation part 12 calculates, from each signal received by the plurality of receive antennas, first phase noise information and second phase noise information relating to phase noise occurring at transmit antennas and the receive antennas. The first correction part 11 corrects a phase of each signal received by the plurality of receive antennas on the basis of the first phase noise information. The frequency domain equalization part 13 performs frequency domain equalization processing that compensates for distortion due to interference from each signal received by the plurality of receive antennas on the corrected received signal. The second correction part 14 corrects, on the basis of the second phase noise information, a phase of the signals obtained by returning the signals, on which the frequency domain equalization processing has been performed, to the time domain by performing an inverse discrete Fourier transform.

By performing the two-stage correction as described, the phase noise independently occurring at each transmit/receive antenna is estimated in the time domain, and interference due to MIMO transmission and inter-symbol interference can be eliminated by the frequency domain equalization processing. As a result, high-capacity and high-quality data transmission in LOS-MIMO transmission can be achieved.

Next, the configuration of the LOS-MIMO demodulation apparatus 10 will be described in more detail with reference to FIGS. 2 and 3. A LOS-MIMO demodulation apparatus 100 is an apparatus that restores two pieces of originally transmitted data from received signals obtained from two antennas in a LOS-MIMO transmission path (FIG. 4) transmitting a data stream independently from each of two antennas and receiving a data stream from the two antennas.

Figure 2:
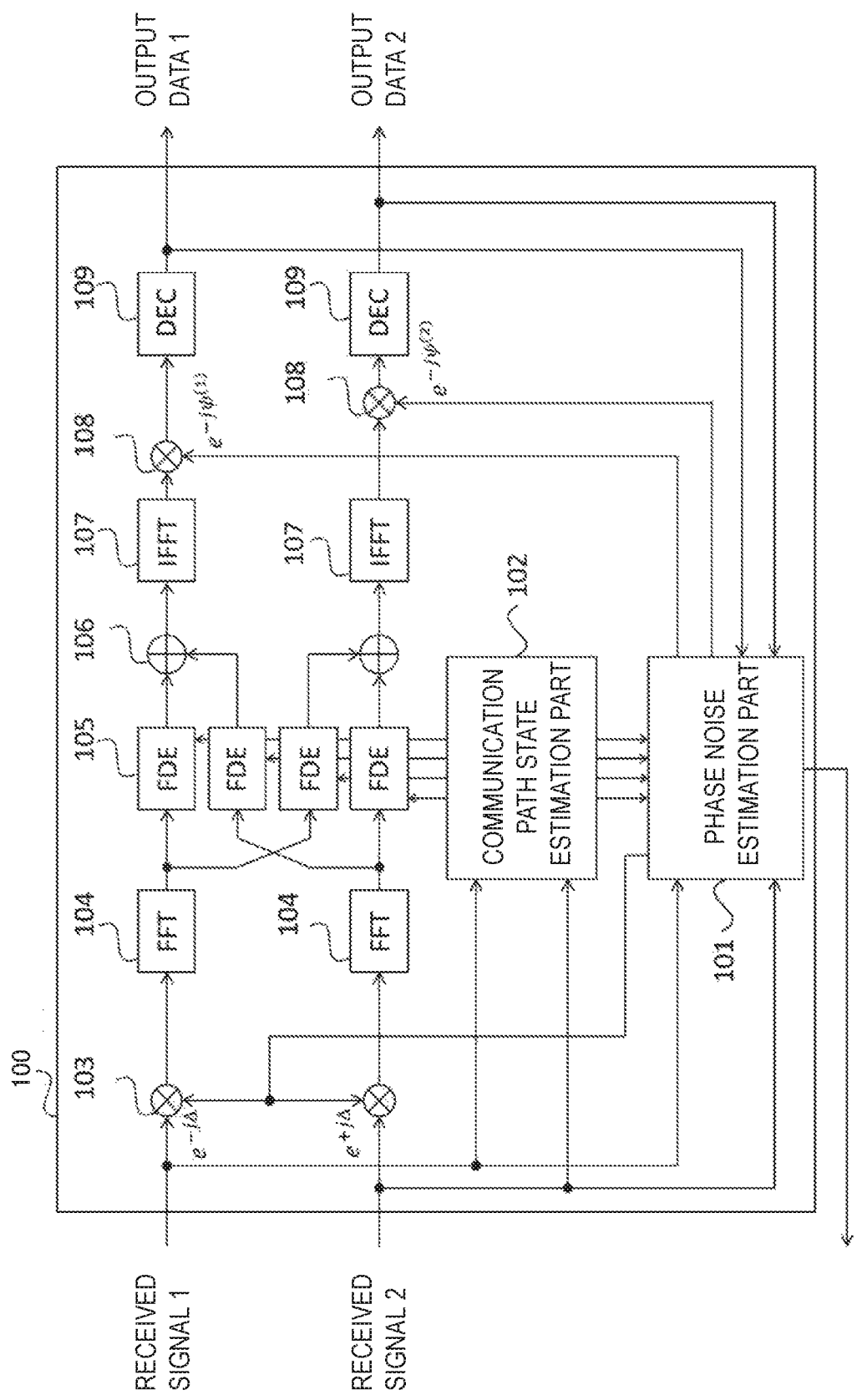
FIG. 2 is a drawing illustrating the configuration of a LOS-MIMO demodulation apparatus of an exemplary embodiment of the present disclosure.

As shown in FIG. 2, the LOS-MIMO demodulation apparatus 100 includes a phase noise estimation part 101, a communication path state estimation part 102, phase rotation multipliers 103 and 108, fast Fourier transformers (FFT) 104, frequency domain equalizers 105, adders 106, inverse fast Fourier transformers (IFFT) 107, and error correction decoding parts 109.

The phase noise estimation part 101 receives signals 1 and 2 obtained from the two receive antennas. The phase noise estimation part 101 estimates three patterns of phase noise information $\Delta$, $\Psi^{(1)}$ and $\Psi^{(2)}$ determined by phase noise $\varphi_T^{(1)}$ and $\varphi_T^{(2)}$ accompanying the two transmit antennas and phase noise $\varphi_R^{(1)}$ and $\varphi_R^{(2)}$ accompanying the two receive antennas from output information of the received signals 1 and 2, the communication path state estimation part 102, and the error correction decoding part 109, and outputs the estimation. These three patterns of phase noise information $\Delta$, $\Psi^{(1)}$ and $\Psi^{(2)}$ are expressed by the following equations.

$$\Delta = (\varphi_R^{(1)} - \varphi_R^{(2)})/2$$

$$\Psi^{(1)} = \varphi_T^{(1)} + (\varphi_R^{(1)} + \varphi_R^{(2)})/2$$

$$\Psi^{(2)} = \varphi_T^{(2)} + (\varphi_R^{(1)} + \varphi_R^{(2)})/2 \quad \text{[Math. 1]}$$

$\Delta$ is referred to as the first phase noise information, and $\Psi^{(1)}$ and $\Psi^{(2)}$ the second phase noise information hereinafter. Further, the number in parentheses in the upper right of each term in the equations below is for distinguishing each piece of data by the number assigned to a transmit or receive antenna. For instance, as evident in [Math. 1], the phase noise $\varphi_T^{(1)}$ accompanying the first transmit antenna is reflected in $\Psi^{(1)}$, and the phase noise $\varphi_T^{(2)}$ accompanying the second transmit antenna is reflected in $\Psi^{(2)}$. Similarly, when combinations of m antennas and FFT outputs are specifically distinguished, they are indicated with parentheses as (p, p) (where p is an integer not greater than M). Further, instead of using parentheses, $\varphi_T^{(1)}$ and $\varphi_T^{(2)}$ can be written as $\varphi_{T1}$ and $\varphi_{T2}$. Similarly, $h^{(p1, p2)}$ can be written as $h_{p1p2}$.

The phase rotation multipliers 103 rotate and correct a phase of the received signals 1 and 2 according to the first phase noise information, which is the output of the phase noise estimation part 101.

The two fast Fourier transformers (FFT) 104 receive the output results of the phase rotation multipliers 103, calculate the frequency components thereof using a Fourier Transform, and output the results.

The frequency domain equalizers (FDE) 105 multiply the output of the fast Fourier transformers by the information supplied by the communication path state estimation part 102, and outputs the results. The frequency domain equalizers 105 eliminate the inter-symbol interference caused by fading in four transmission paths constituted by the two transmit antennas and the two receive antennas. As shown in FIG. 2, the output data of the four frequency domain equalizers (FDE) 105 is divided into two pairs, each pair is added up by the adder 106, and the inverse fast Fourier transformers (IFFT) 107 convert the results from frequency domain data into time domain data.

The phase rotation multipliers 108 rotate the phase of the output signals of the inverse fast Fourier transformers 107 according to the second phase noise information $\Psi^{(1)}$, $\Psi^{(2)}$, which is the output of the phase noise estimation part 101, and output the results.

The error correction decoding parts 109 receive the output signals of the phase rotation multipliers 108, decode an error correction code, and output the corrected data. The outputs of the error correction decoding parts 109 become the output data of the LOS-MIMO demodulation apparatus 100.

Figure 3:
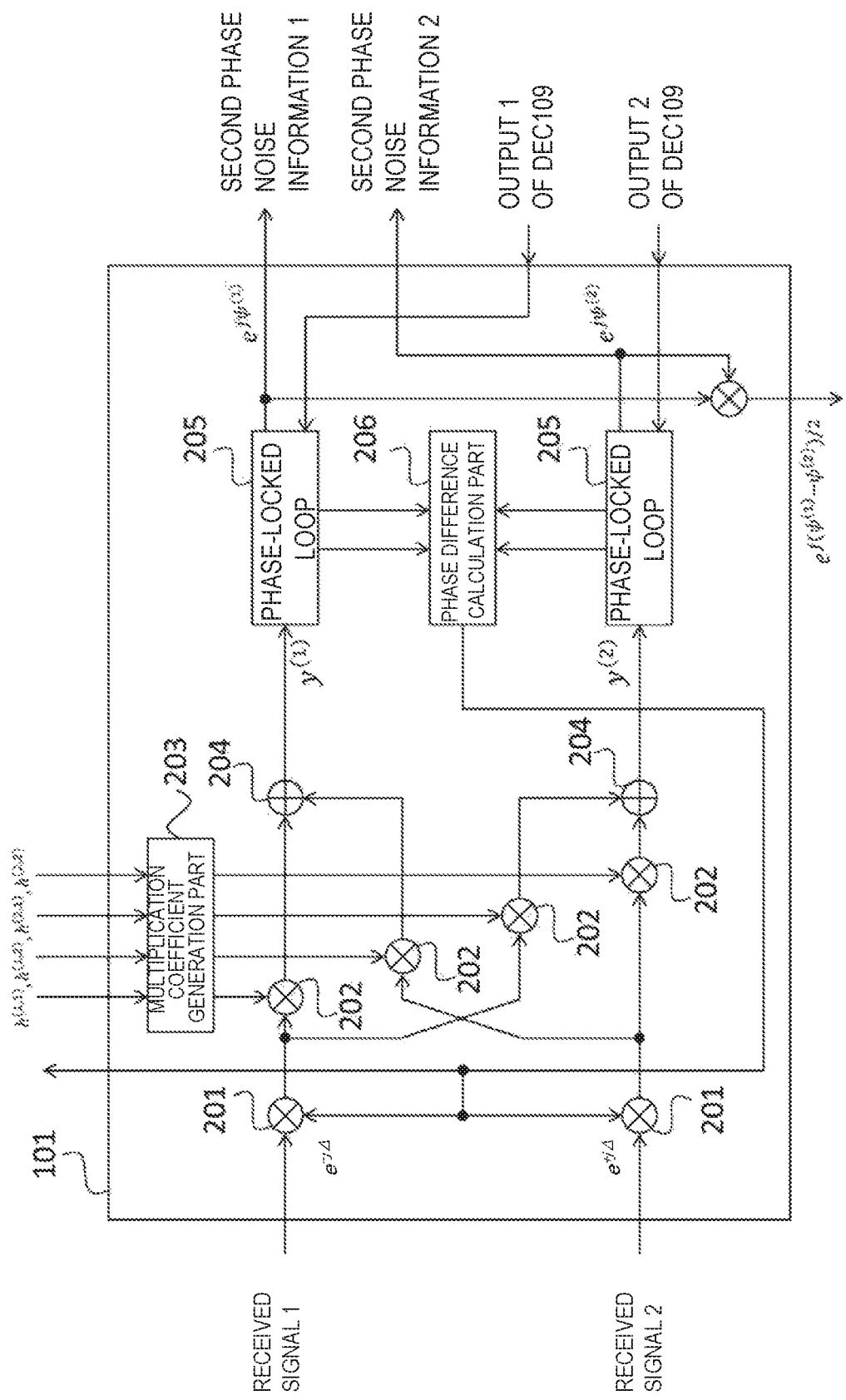
FIG. 3 is a drawing illustrating a detailed configuration of a phase noise estimation part in FIG. 1.

FIG. 3 is a block diagram illustrating an exemplary embodiment of the phase noise estimation part 101. FIG. 3 shows a configuration including phase rotation multipliers 201, MIMO interference cancellation multipliers 202, a multiplication coefficient generation part 203, MIMO interference cancellation adders 204, phase-locked loops 205, and a phase difference calculation part 206.

The phases of received data of the signals 1 and 2 obtained from the two receive antennas are corrected by the phase rotation multipliers 201 with the first phase noise information $\Delta$ outputted by the phase difference calculation part 206. The multipliers 202 and the adders 204 remove a MIMO interference component from the received data after the phase correction has been performed. The multiplication coefficient for the multiplier 202 is supplied by the multiplication coefficient generation part 203. Output signals $y^{(1)}$ and $y^{(2)}$ of the two MIMO interference cancellation adders 204 are supplied to each of the phase-locked loops 205. In other words, the multipliers 202, the multiplication coefficient generation part 203, and the adders 204 weight and add the received signals. The phase-locked loops 205 calculates and outputs the second phase noise information $e^{j(\Psi^{(1)}-\Psi^{(2)})}$, the estimation result of residual phase noise.

According to the configuration described above, the phase noise independently occurring at each transmit/receive antenna can be estimated in the time domain, and the interference due to MIMO transmission and the inter-symbol interference can be eliminated by the frequency domain equalization processing. As a result, high-capacity and high-quality data transmission in LOS-MIMO transmission can be achieved.

Exemplary Embodiment 1

Next, a first exemplary embodiment of the present disclosure will be described in detail with reference to the drawings. First, a wireless transmission method including the LOS-MIMO demodulation apparatus 100 will be described. The description below applies to modulation methods using phase information for identifying data, and as an example, a case of quadrature amplitude modulation (QAM) will be described.

Figure 4:
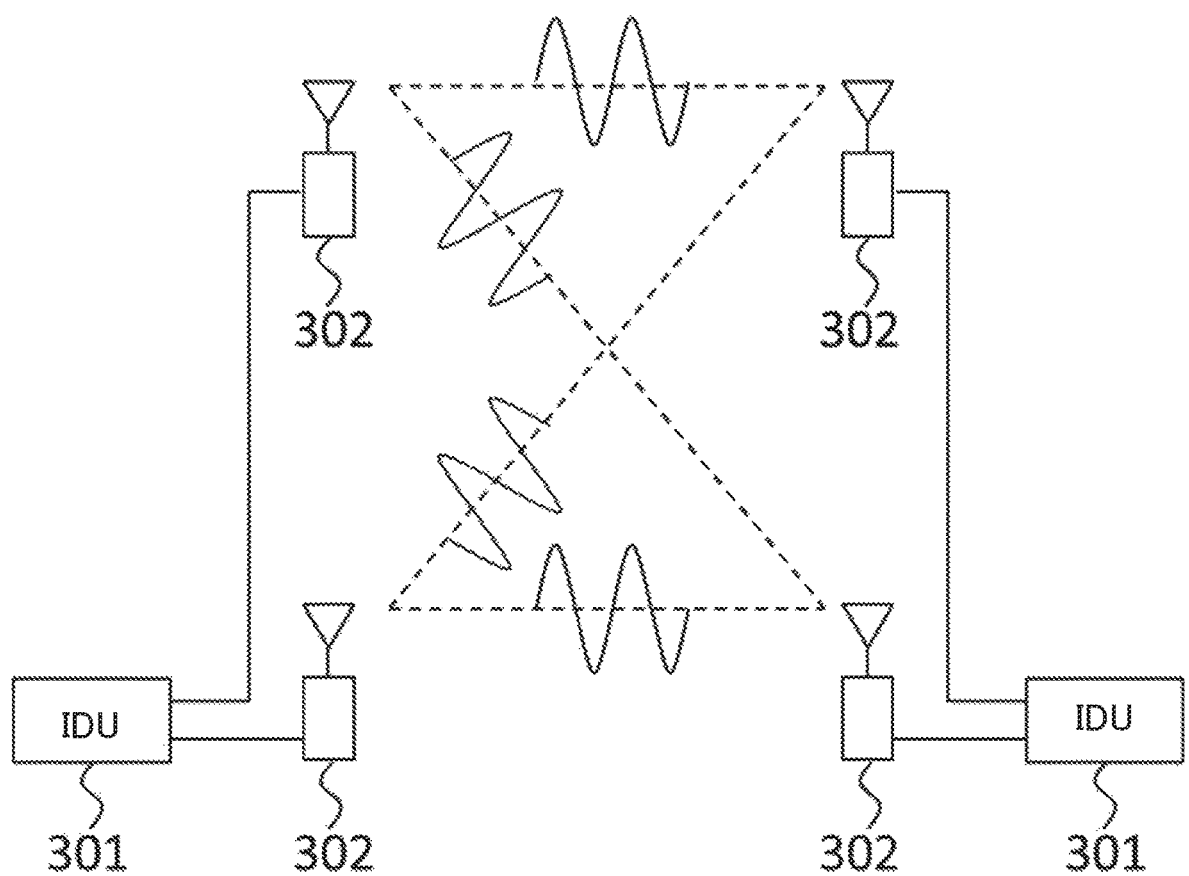
FIG. 4 is a drawing showing the configuration of a LOS-MIMO transmission system of a first exemplary embodiment of the present disclosure.

FIG. 4 is a block diagram showing the configuration of a LOS-MIMO wireless transmission system having two transmit antennas and two receive antennas. FIG. 4 shows a configuration in which data is transmitted/received between indoor units (IDU) 301, to each of which two outdoor units (ODU) 302 are connected, using the antennas of the outdoor units 302.

Figure 5:
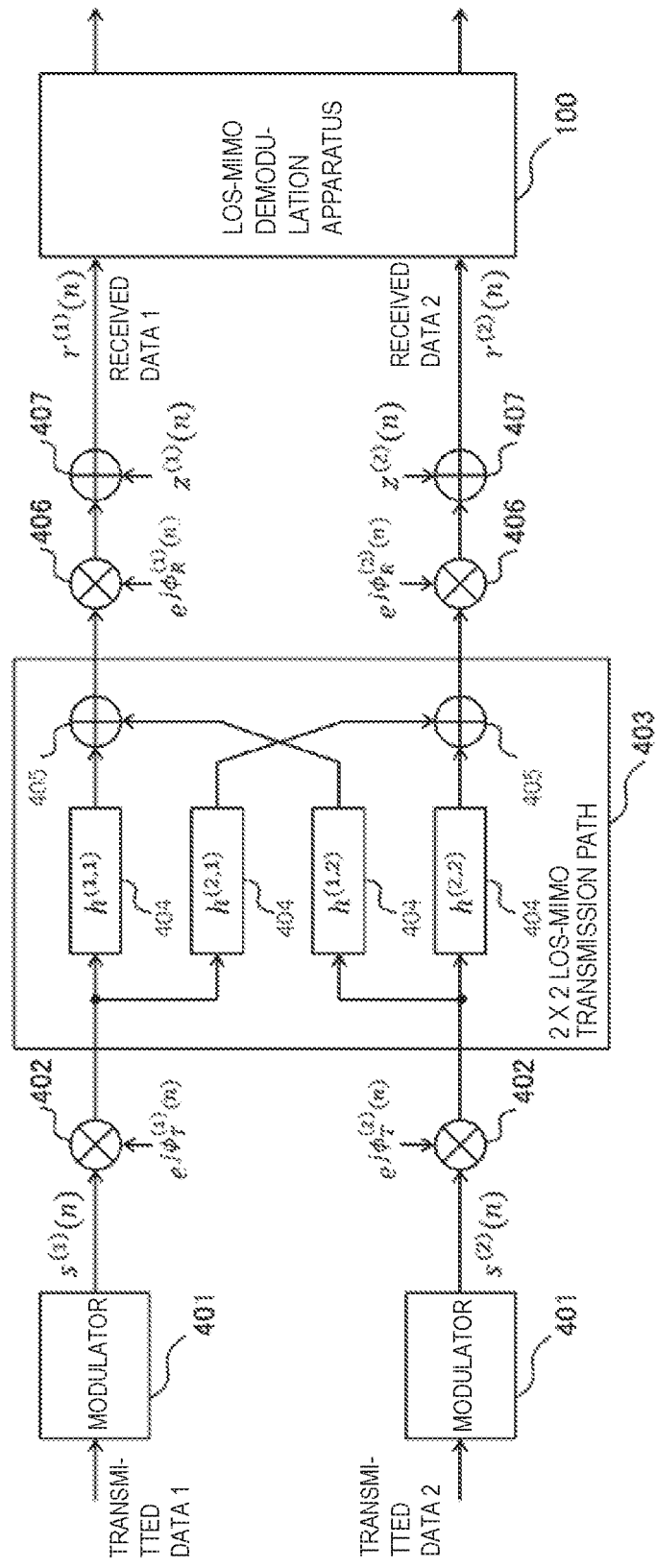
FIG. 5 is a drawing showing LOS-MIMO transmission (no feedback transmission line) with a baseband signal model.

FIG. 5 is a block diagram showing modulation/demodulation processing parts included in the indoor units 301, the sources of noise occurring at the outdoor units 302, and a LOS-MIMO transmission path with a baseband signal processing model, and the diagram shows the relationship between transmitted data and input signals of the LOS-MIMO demodulation apparatus 100.

In the model of FIG. 5, the transmission side includes two modulators 401 and two phase noise sources 402 on the transmission side, and the LOS-MIMO transmission path is constituted by fading channels 404 comprised of four transmission paths and MIMO interferences 405. The reception side includes phase noise sources 406 on the reception side, thermal noise sources 407, and the LOS-MIMO demodulation apparatus 100 of the present disclosure.

In a QAM system, when the number of signal points is $2^m$ (m is a positive integer), the modulator 401 divides transmitted data into blocks of m bits and m bits are mapped onto one of $2^m$ signal points. The mapped signal points can be represented by complex values; therefore, signals are expressed by complex numbers in a baseband model.

Figure 6:
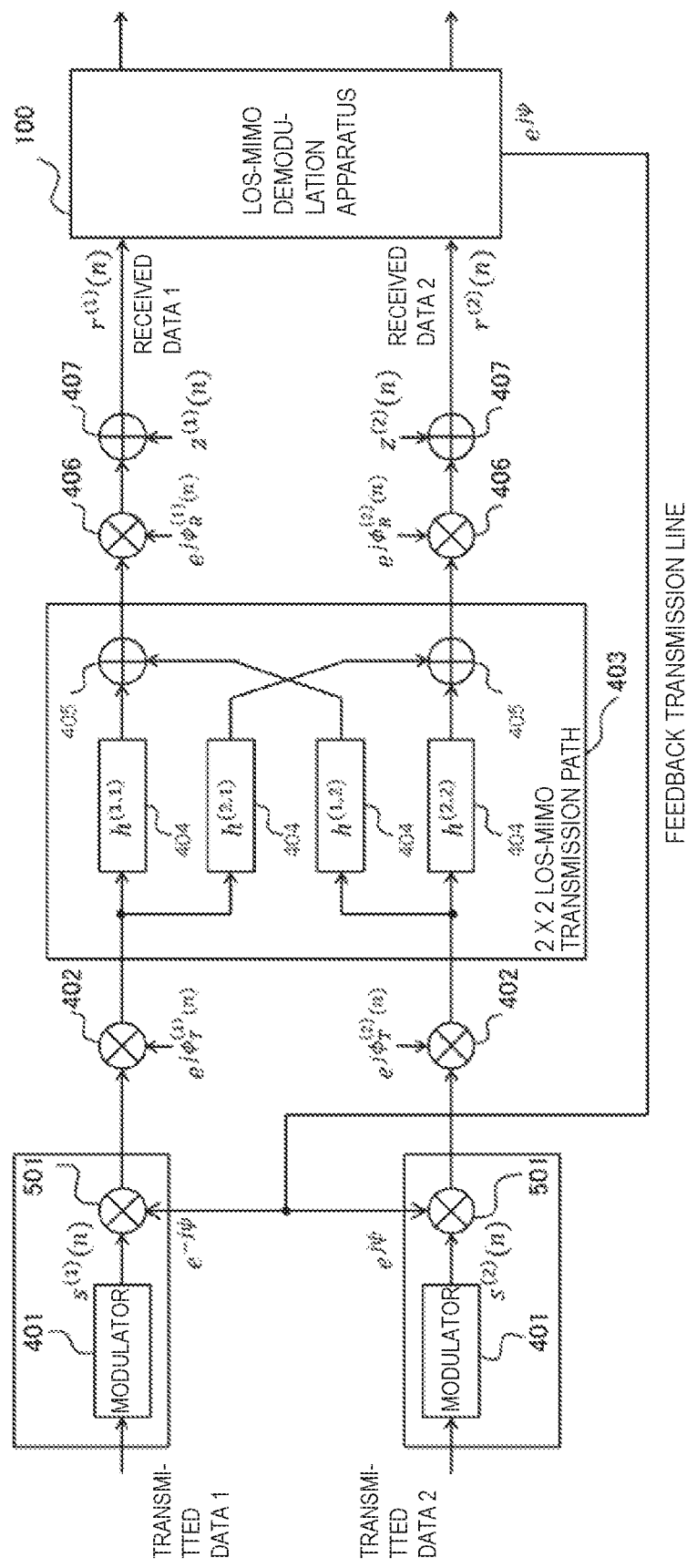
FIG. 6 is a drawing showing LOS-MIMO transmission (with a feedback transmission line) with a baseband signal model.

FIG. 6 shows a baseband signal processing model of LOS-MIMO transmission with a feedback transmission line from the receiver to the transmitter. FIG. 6 is different from FIG. 5 in that there is the feedback transmission line. In the baseband signal processing model of FIG. 6, the transmission side processes signals transmitted to the LOS-MIMO transmission path using information fed back from the LOS-MIMO demodulation apparatus 100. The details of this processing will be described later.

Figure 7:
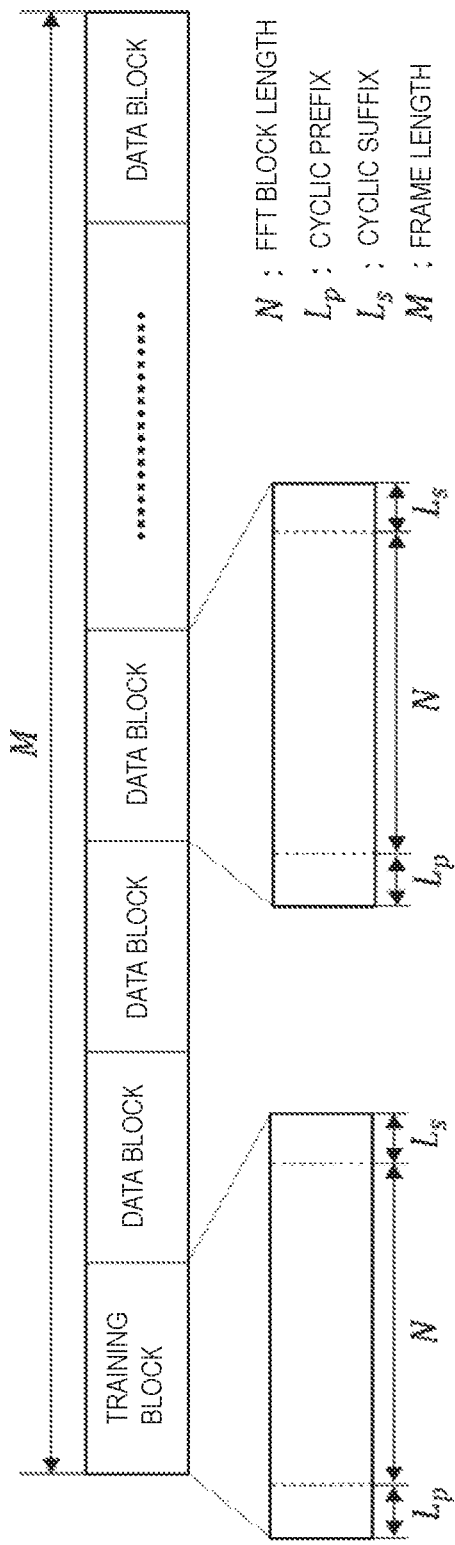
FIG. 7 is a drawing showing an example of a transmission signal frame format used in the first exemplary embodiment of the present disclosure.

FIG. 7 shows a typical example of a signal format relating to signals transmitted via a LOS-MIMO transmission path. The signal format is comprised of a training block for estimating a channel state and data blocks. The training block and the data blocks include a training sequence and a data sequence, each of which having a length N, and a cyclic prefix and a cyclic suffix having lengths of $L_p$ and $L_s$, respectively. Here, as described later, N is a power of 2 since it expresses the block length of fast Fourier transform, and $L_p$ and $L_s$ are integers not less than zero. In the description below, it is assumed that the two signals supplied to the LOS-MIMO demodulation apparatus 100 follow the format shown in FIG. 7.

Each part of the LOS-MIMO demodulation apparatus 100 will be described with reference to FIG. 1. The training block parts of the input signals to the LOS-MIMO demodulation apparatus 100 are fed to the communication path state estimation part 102 and processed. The blocks other than the training block, the data blocks, are fed to the phase noise estimation part 101 and are also supplied to the phase rotation multipliers 103 for performing correction with the first phase noise information. The operation of the communication path state estimation part 102 and the phase noise estimation part 101 will be described later.

The input signals $r^{(1)}(n)$ and $r^{(2)}(n)$ to the LOS-MIMO demodulation apparatus 100 are supplied to the phase rotation multipliers 103 as described above. The first phase noise information FPN, the output of the phase noise estimation part 101, is also fed to the phase rotation multipliers 103. The first phase noise information FPN is expressed by [Math. 2]. The outputs of the phase rotation multipliers 103 are $r^{(1)'}(n) = e^{-j\Delta(n)} r^{(1)}(n)$ and $r^{(2)'}(n) = e^{j\Delta(n)} r^{(2)}(n)$. Then, the outputs $r^{(1)'}(n)$ and $r^{(2)'}(n)$ of the phase rotation multipliers 103 are supplied to the fast Fourier transformers (FFT) 104. The outputs $R^{(1)}(n)$ and $R^{(2)}(n)$ of the fast Fourier transformers (FFT) 104 are expressed by the following equation [Math. 3] (n denotes an integer between zero and (N−1)).

$$FPN = e^{j\Delta(n)} \quad [\text{Math. 2}]$$

$$R^{(1)}(n) = \frac{1}{\sqrt{N}} \sum_{k=0}^{N-1} r^{(1)'}(k) e^{-j2\pi kn/N}, \quad [\text{Math. 3}]$$

$$R^{(2)}(n) = \frac{1}{\sqrt{N}} \sum_{k=0}^{N-1} r^{(2)'}(k) e^{-j2\pi kn/N}$$

The outputs of the fast Fourier transformer 104 are fed to the four frequency domain equalizers (FDE) 105. The frequency domain equalizers 105 multiply signals $Q^{(1,1)}(n)$, $Q^{(1,2)}(n)$, $Q^{(2,1)}(n)$, and $Q^{(2,2)}(n)$ provided by the communication path state estimation part 102 by the aforementioned $R^{(1)}(n)$ and $R^{(2)}(n)$ and output the results. The output data of the four frequency domain equalizers 105 is divided into two pairs, and each pair is added up by the adder 106. The outputs $Y^{(1)}(n)$ and $Y^{(2)}(n)$ of the two adders 106 can be expressed by the following equation [Math. 4].

$$Y^{(1)}(n) = Q^{(1,1)}(n) R^{(1)}(n) + Q^{(1,2)}(n) R^{(2)}(n)$$

$$Y^{(2)}(n) = Q^{(2,1)}(n) R^{(1)}(n) + Q^{(2,2)}(n) R^{(2)}(n) \quad [\text{Math. 4}]$$

The outputs $Y^{(1)}(n)$ and $Y^{(2)}(n)$ of [Math. 4] are fed to the inverse fast Fourier transformers (IFFT) 107. The inverse fast Fourier transformers 107 calculate and output $y^{(1)}(n)$ and $y^{(2)}(n)$ indicated in the following [Math.5].

$$y^{(1)}(n) = \frac{1}{\sqrt{N}} \sum_{k=0}^{N-1} Y^{(1)}(k) e^{j2\pi kn/N}, \quad [\text{Math. 5}]$$

$$y^{(2)}(n) = \frac{1}{\sqrt{N}} \sum_{k=0}^{N-1} Y^{(2)}(k) e^{j2\pi kn/N}$$

The outputs of the inverse fast Fourier transformers (IFFT) 107 are fed to the phase rotation multipliers 108 and are multiplied by the second phase noise information $SPN^{(1)}$ and $SPN^{(2)}$, the outputs of the phase noise estimation part 101 shown in [Math. 6] below. The error correction decoding parts 109 perform error correction processing on the output signals $SPN^{(1)} y^{(1)}(n)$ and $SPN^{(2)} y^{(2)}(n)$ of the phase rotation multipliers 108, estimate transmitted data, and output the results. The outputs of the error correction decoding parts can help the phase noise estimation part 102, described later, improve the accuracy of calculating the first phase noise information FPN and the second phase noise information $SPN^{(1)}$ and $SPN^{(2)}$.

$$SPN^{(1)} = e^{-j\psi^{(1)}(n)}, SPN^{(2)} = e^{-j\psi^{(2)}(n)} \quad [\text{Math. 6}]$$

Next, the operation of the phase noise estimation part 101 will be described with reference to FIG. 3. In the baseband signal transmission model shown in FIG. 5 or 6, when $s^{(1)}(n)$ denotes a signal transmitted from an antenna 1 and $s^{(2)}(n)$ a signal transmitted from an antenna 2 (n is an integer representing the point in time), the corresponding received signals $r^{(1)}(n)$ and $r^{(2)}(n)$ can be expressed by the following [Math. 7] using a matrix representation.

$$\begin{bmatrix} r^{(1)}(n) \\ r^{(2)}(n) \end{bmatrix} = \begin{bmatrix} e^{j\Delta(n)} & 0 \\ 0 & e^{-j\Delta(n)} \end{bmatrix} \begin{bmatrix} h^{(1,1)}(0) & h^{(1,2)}(0) \\ h^{(2,1)}(0) & h^{(2,2)}(0) \end{bmatrix} \quad [\text{Math. 7}]$$

$$\begin{bmatrix} e^{j\psi^{(1)}(n)} & 0 \\ 0 & e^{-j\psi^{(2)}(n)} \end{bmatrix} \begin{bmatrix} s^{(1)}(n) \\ s^{(2)}(n) \end{bmatrix} + \begin{bmatrix} z^{(1)}(n) \\ z^{(2)}(n) \end{bmatrix}$$

Here, $z^{(1)}(n)$ and $z^{(2)}(n)$ denote thermal noise components. The exponent $\Delta(n)$ of the first phase noise information and the exponents $\Psi^{(1)}(n)$ and $\Psi^{(2)}(n)$ of the second phase noise information can be expressed by the following [Math. 8] and [Math. 9] with the phase noise $\varphi_T^{(1)}(n)$ and $\varphi_T^{(2)}(n)$ associated with the transmit antennas 1 and 2 and the phase noise $\varphi_R^{(1)}(n)$ and $\varphi_R^{(2)}(n)$ associated with the receive antennas 1 and 2.

$$\Delta(n)=(\varphi_R^{(1)}(n)-\varphi_R^{(2)}(n))/2$$

$$\Psi^{(1)}(n)=\varphi_T^{(1)}(n)+(\varphi_R^{(1)}(n)+\varphi_R^{(2)}(n))/2$$

$$\Psi^{(2)}(n)=\varphi_T^{(2)}(n)+(\varphi_R^{(1)}(n)+\varphi_R^{(2)}(n))/2 \qquad \text{[Math. 8]}$$

The phase noise estimation part 101 in FIG. 3 receives the signals $r^{(1)}(n)$ and $r^{(2)}(n)$, and estimates and outputs the exponent $\Delta(n)$ of the first phase noise information and the exponents $\Psi^{(1)}(n)$ and $\Psi^{(2)}(n)$ of the second phase noise information shown in [Math. 8] and [Math. 9] above. The operation thereof will be described below.

The phase rotation multipliers 201 performs phase rotation processing on the received signals $r^{(1)}(n)$ and $r^{(2)}(n)$ with the output information of the phase difference calculation part 206. The output of the phase difference calculation part 206 is the result of estimating the exponent $\Delta(n)$ of the first phase noise information in [Math. 8], as described later, and the outputs of the two phase rotation multipliers 201 are $e^{-j\Delta(n)}r^{(1)}(n)$ and $e^{j\Delta(n)}r^{(2)}(n)$, respectively. Next, the outputs of the phase rotation multipliers 201 are multiplied by the four multipliers 202 by the multiplication coefficients supplied by the multiplication coefficient generation part 203, and then added up by the adders 204. The constants provided by the multiplication coefficient generation part 203 are, for instance, four elements $q^{(1,1)}$, $q^{(1,2)}$, $q^{(2,1)}$, and $q^{(2,2)}$ of a 2×2 matrix q expressed by the following [Math. 10].

$$q = \begin{bmatrix} q^{(1,1)} & q^{(1,2)} \\ q^{(2,1)} & q^{(2,2)} \end{bmatrix} \begin{bmatrix} h^{(1,1)}(0) & h^{(1,2)}(0) \\ h^{(2,1)}(0) & h^{(2,2)}(0) \end{bmatrix}^{-1} \qquad \text{[Math. 10]}$$

Note that $h^{(1,1)}(0)$, $h^{(1,2)}(0)$, $h^{(2,1)}(0)$, and $h^{(2,2)}(0)$ are provided by the communication path state estimation part 102. Therefore, when the exponent $\Delta(n)$ of the first phase noise information, outputted by the phase difference calculation part 206, includes almost no error, $y^{(1)}(n)$ and $y^{(2)}(n)$, the calculation result of the multipliers 202 and the adders 204, will be $y^{(1)}(n)=SPN^{(1)}s^{(1)}(n)+w^{(1)\prime}(n)$ and $\Psi^{(2)}(n)=SPN^{(2)}s^{(2)}(n)+w^{(2)\prime}(n)$. Here, $w^{(1)\prime}(n)$ and $w^{(2)\prime}(n)$ denote thermal noise components. Therefore, in this case, by feeding the output data of each adder 204 to the phase-locked loop 205, $SPN^{(1)}$ and $SPN^{(2)}$ can be estimated.

Further, another set of inputs to the phase-locked loops 205 in FIG. 3 is provided by the outputs of the error correction decoding part 109. Estimating a phase error using comparison with the data after the error correction processing is expected to improve the accuracy of the phase-locked loops, however, this is a measure for dealing with cases where high accuracy is required, and is not necessary. When the output results of the error correction decoding parts are not used, the phase-locked loops estimate a phase error using comparison with the hard decision results of the input signals, as phase-locked loops normally does. Further, in addition to the second phase noise information $SPN^{(1)}$ and $SPN^{(2)}$, the phase noise estimation part in FIG. 3 also outputs phase noise information $PN_{FEEDBACK}$ determined by the difference value thereof and shown in [Math. 11]. This is used in the LOS-MIMO transmission system with a feedback transmission line modeled in the block diagram shown in FIG. 6, and not in the LOS-MIMO transmission system modeled in the block diagram shown in FIG. 5.

$$PN_{FEEDBACK}=e^{j(\Psi^{(1)}(n)-\Psi^{(2)}(n))/2}=e^{j\Psi(n)} \qquad \text{[Math. 11]}$$

FIG. 6 shows a baseband signal processing model of LOS-MIMO transmission with a feedback transmission line from the receiver to the transmitter. As already mentioned, the difference between FIG. 6 and FIG. 5 is that FIG. 6 has a feedback transmission line, which transmits the phase noise information $PN_{FEEDBACK}$, an output of the phase noise estimation part 101, to the transmission side. Provided on the transmission side, phase rotation multipliers 501 multiply the transmitted data $s^{(1)}(n)$, $s^{(2)}(n)$ and the phase noise information and transmit the results as $e^{-j\Psi(n)}s^{(1)}(n)$ and $e^{j\Psi(n)}s^{(2)}(n)$, respectively.

Figure 8:
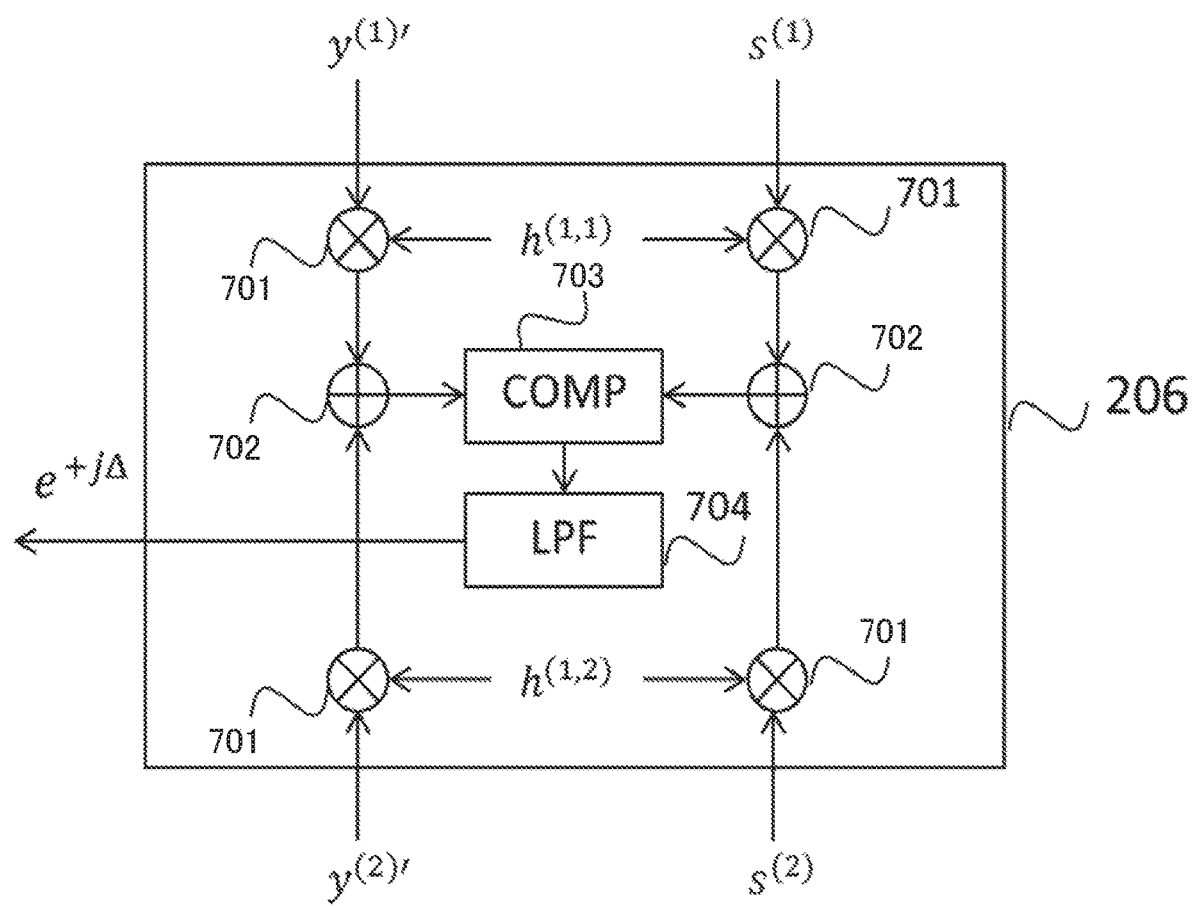
FIG. 8 is a block diagram illustrating a detailed configuration of a phase difference calculation part of the first exemplary embodiment of the present disclosure.

Next, the operation of the phase difference calculation part 206 will be described. FIG. 8 is a block diagram showing an exemplary embodiment of the phase difference calculation part 206. The phase difference calculation part 206 in FIG. 8 includes multipliers 701, adders 702, a phase comparator 703, and a low-pass filter 704. Transmitted signals $s^{(1)}$ and $s^{(2)}$, closest to each of the signals $y^{(1)\prime}=SPN^{(1)}y^{(1)}(n)$, $y^{(2)\prime}=SPN^{(2)}y^{(1)}(n)$ calculated within the two phase-locked loops and the signals $y^{(1)\prime}$, $y^{(2)\prime}$, are fed. These input signals are converted into inputs $a=\Psi^{(1)\prime}h^{(1,1)}(0)+y^{(2)\prime}h^{(1,2)}(0)$ and $b=s^{(1)}h^{(1,1)}(0)+s^{(2)}h^{(1,2)}(0)$ to the phase comparator 703 through the multipliers 701 and the adders 702. The phase comparator 703 outputs the phase difference between the two inputs a and b. Further, $h^{(1,1)}(0)$, $h^{(1,2)}(0)$, $h^{(2,1)}(0)$, and $h^{(2,2)}(0)$ are provided by the communication path state estimation part 102, as described above, although this is omitted in the drawing in order to avoid complication. An output of the phase comparator 703, whose high frequency components are cut by the low-pass filter 704, is outputted as a signal $e^{j\Delta(n)}$ representing the phase difference. As described, the phase noise estimation part 101 calculates and outputs the first and the second phase noise information FPN, $SPN^{(1)}$, and $SPN^{(2)}$ from the received signals $r^{(1)}(n)$ and $r^{(2)}(n)$ supplied to the LOS-MIMO demodulation apparatus 100.

Next, the operation of the communication path state estimation part 102 will be described. The communication path state estimation part 102 calculates four sequences $((Q^{(u,v)}(0), Q^{(u,v)}(1), \ldots, Q^{(u,v)}(N-1)$; each of u and v denotes one or two) having the length N from a subsequence (written as $r_T^{(1)}(0), r_T^{(1)}(1), \ldots, r_T^{(1)}(N-1)$ of the training sequence of received data 1 and a subsequence (written as $r_T^{(2)}(0), r_T^{(2)}(1), \ldots, r_T^{(2)}(N-1)$ of the training sequence of received data 2 in the transmission frame format shown in FIG. 7, and outputs the results.

Figure 9:
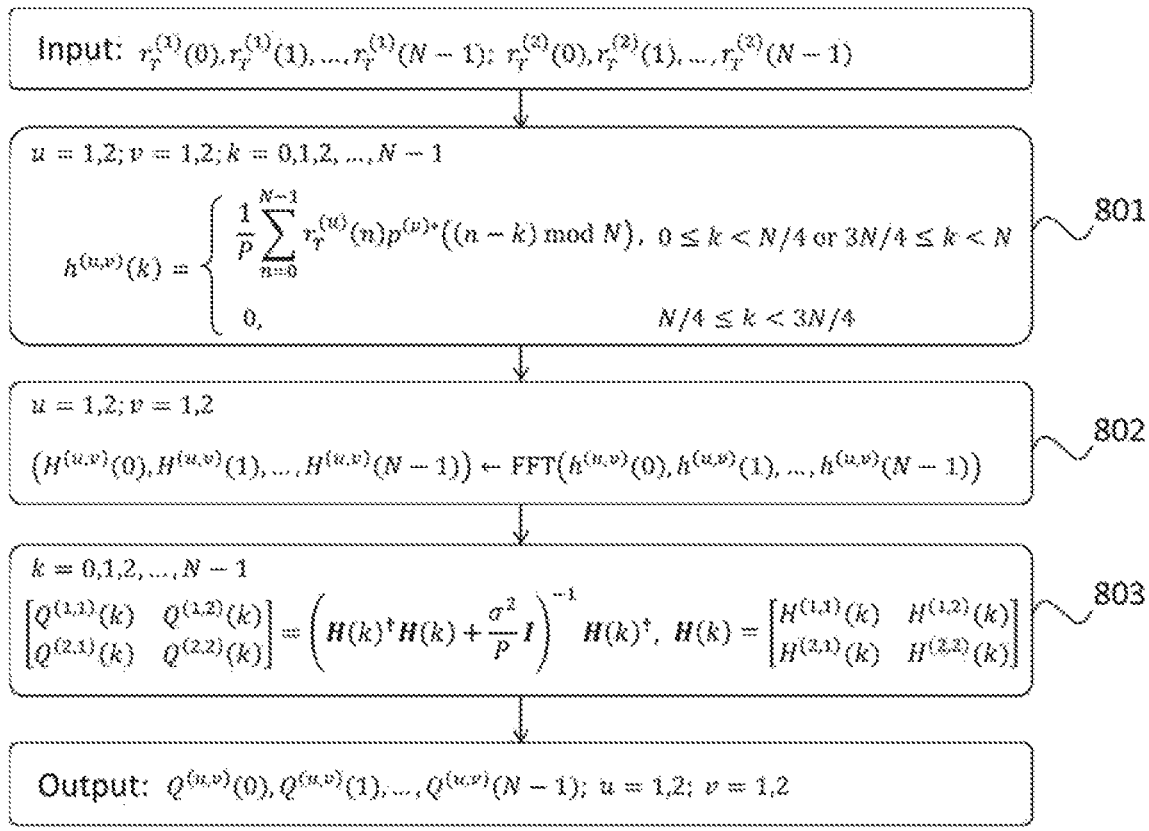
FIG. 9 is a flowchart showing the operation of the first exemplary embodiment of the present disclosure.

FIG. 9 is a flowchart showing the procedure of a communication path state estimation method, the function of the communication path state estimation part 102. [Math. 12] shows a training sequence $p^{(1)}(0), p^{(1)}(1), \ldots, p^{(1)}(N-1)$ transmitted from the transmit antenna 1 and a training sequence $p^{(2)}(0), p^{(2)}(1), \ldots, p^{(2)}(N-1)$ transmitted from the transmit antenna 2.

$$p^{(1)}(k) = \sqrt{P}\exp\left(-\frac{j\pi(n-N/4)^2}{N}\right), k = 0, 1, \ldots, N-1 \qquad \text{[Math. 12]}$$

$$p^{(2)}(k) = \sqrt{P}\exp\left(-\frac{j\pi(n+N/4)^2}{N}\right), k = 0, 1, \ldots, N-1$$

Note that P denotes the average power value of the transmitted data in [Math. 12]. The communication path state estimation part 102 first calculates four sequences $h^{(u,v)}(0), h^{(u,v)}(1), \ldots, h^{(u,v)}(N-1)$ (each of u and v denotes one or two) having the length N according to a calculation method shown in 801 of the flowchart in FIG. 9 (* denotes the complex conjugate in 801). Out of sequences having the length N determined by convoluting the transmitted training signal sequences with the corresponding received signals, these are sequences obtained by masking half, an N/2 number, of signal portions to zero. In other words, in the process described above, out of the signal sequences having the length N obtained by convoluting a signal sequence $p^{(v)*}$ comprised of the complex conjugate of a training signal having the length N transmitted from each of the transmit antennas with a received signal $r_T^{(u)}$ having the length N obtained by sampling the training signal as a transmitted signal to the LOS-MIMO transmission path at the same rate, the signal sequences having the length N obtained by masking a half thereof, an N/2 number, of signals to zero are calculated (refer to 801 in FIG. 9).

Next, as shown in 802 of the flowchart in FIG. 9, the communication path state estimation part 102 performs a Fourier transform on each of the four sequences $h^{(u, v)}(0)$, $h^{(u, v)}(1)$, ..., $h^{(u, v)}(N-1)$ having the length N, and calculates four sequences $H^{(u, v)}(0)$, $H^{(u, v)}(1)$, ..., $H^{(u, v)}(N-1)$ having the length N.

Finally, as shown in 803 of the flowchart in FIG. 9, the communication path state estimation part 102 processes the four sequences $H^{(u, v)}(0)$, $H^{(u, v)}(1)$, ..., $H^{(u, v)}(N-1)$, and calculates and outputs four sequences $Q^{(u, v)}(0)$ $Q^{(u, v)}(1)$ ..., $Q^{(u, v)}(N-1)$ having the length N.

Further, H(k) is a matrix having $H^{(u, v)}(k)$ as a (u, k) component, and H(k)^† denotes the conjugate transpose of matrix H(k). The process shown in 803 of FIG. 9 corresponds to means for calculating tap coefficients for frequency domain equalization that minimize the mean square error with H(k), k=0, 1, ..., N−1 as the frequency response of the LOS-MIMO transmission path. In the example of FIG. 9, the four sequences $Q^{(u, v)}(0)$, $Q^{(u, v)}(1)$, ..., $Q^{(u, v)}(N-1)$ having the length N become the tap coefficients of the frequency domain equalizers 105.

As described, according to the communication path state estimation method in FIG. 9, tap coefficients required for frequency domain equalization can be calculated without increasing the ratio of training signals per transmission capacity, compared with SISO transmission. Further, as mentioned above, the four pieces of data $h^{(1, 1)}(0)$, $h^{(1, 2)}(0)$, $h^{(2, 1)}(0)$, and $h^{(2, 2)}(0)$ obtained by the process shown in 801 in the flowchart of FIG. 9 are provided by the phase noise estimation part 101. The multiplication coefficient generation part 203 in the phase noise estimation part in FIG. 3 calculates the multiplication coefficients $q^{(1, 1)}$, $q^{(1, 2)}$, $q^{(2, 1)}$, and $q^{(2, 2)}$ from these four pieces of data in [Math. 10].

The LOS-MIMO demodulation apparatus described above can be suitably applied to digital wireless communication apparatuses in general including mobile terminal devices and trunk wireless devices that support LOS-MIMO transmission.

Exemplary Embodiment 2

Figure 10:
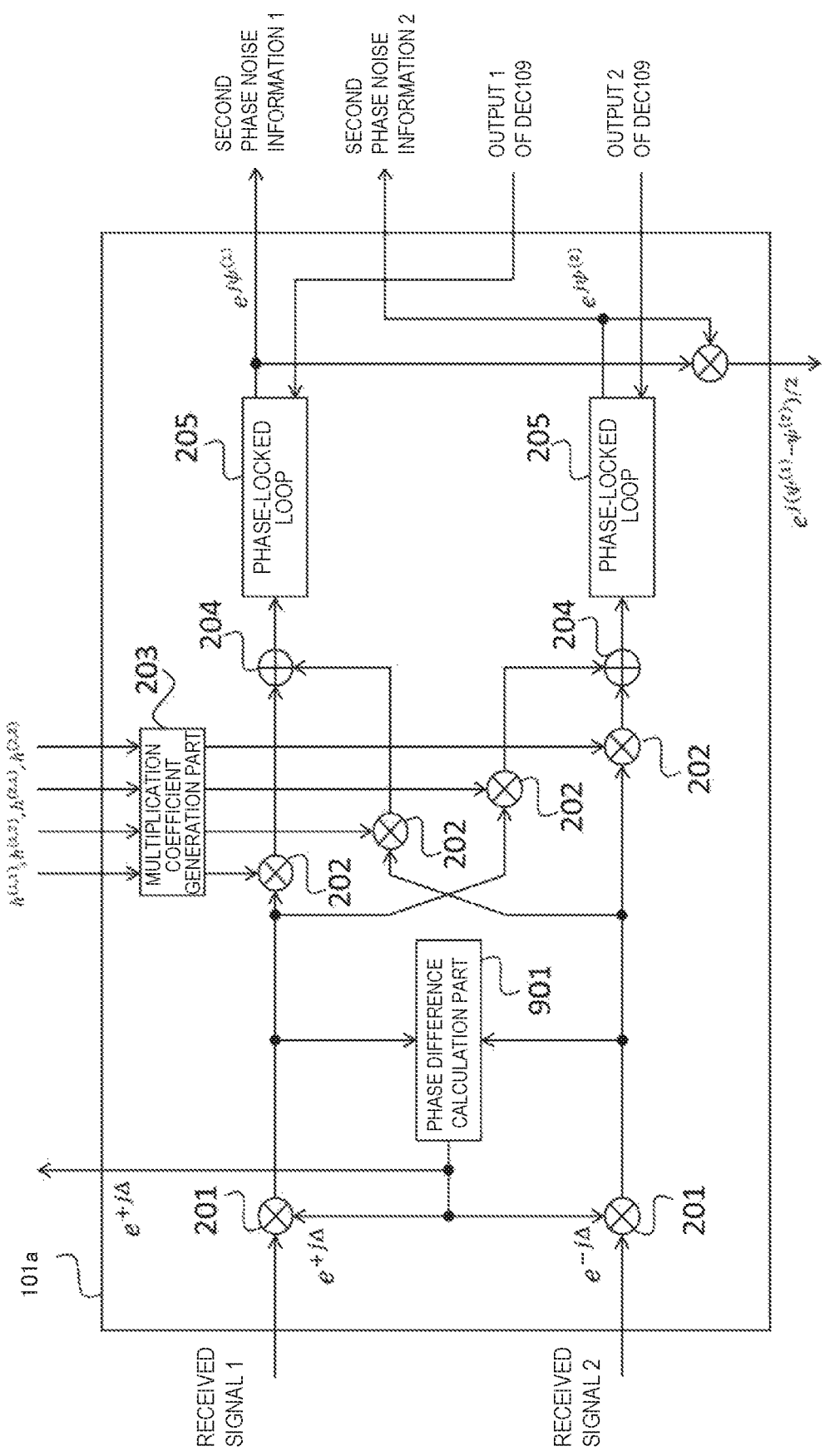
FIG. 10 is a drawing illustrating a detailed configuration of a phase noise estimation part of a LOS-MIMO demodulation apparatus of a second exemplary embodiment of the present disclosure.

Next, a second exemplary embodiment, in which the phase noise estimation part is modified, will be described with reference to FIG. 10. FIG. 10 is a block diagram illustrating the configuration of a phase noise estimation part of the second exemplary embodiment of the present disclosure. The components in the phase noise estimation part shown in FIG. 10 are the same as those of the phase noise estimation part of the first exemplary embodiment shown in FIG. 3, except for the differences that a phase difference calculation part 901 offers. The phase noise estimation part 101a in FIG. 10 is suitable in a case where the signal format of the signal frame transmitted (FIG. 7) includes a pilot signal for phase noise compensation.

Figure 11:
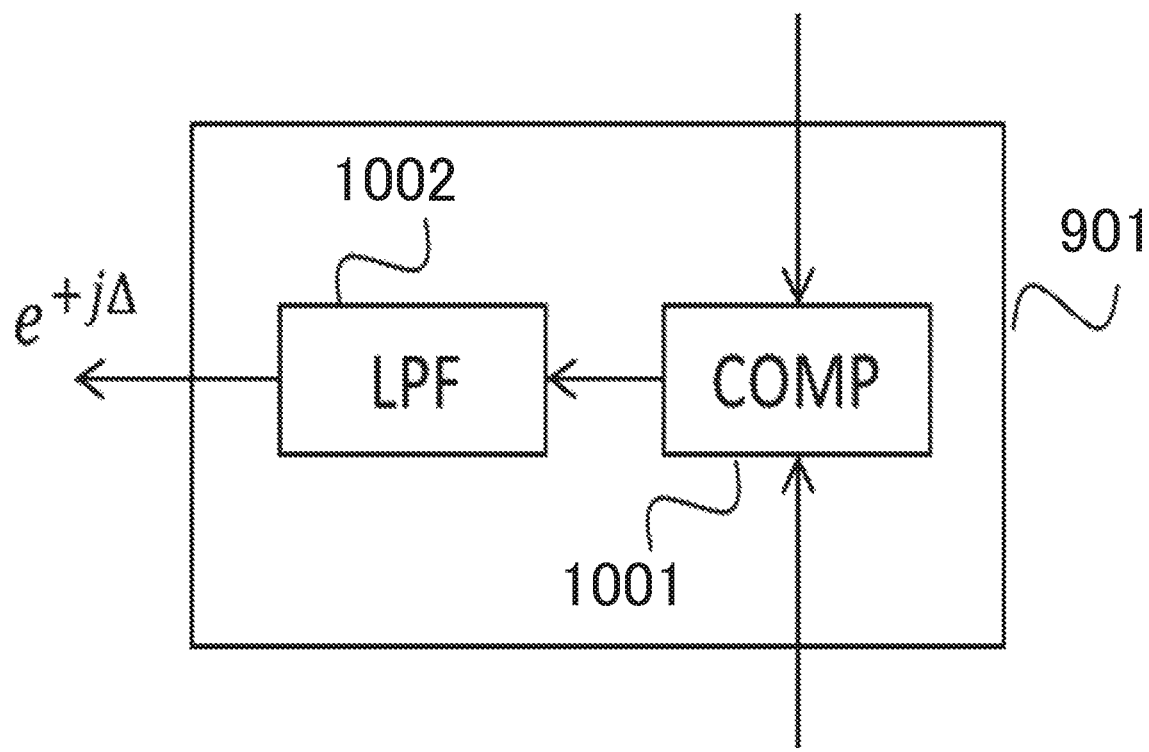
FIG. 11 is a block diagram showing a detailed configuration of a phase difference calculation part of the second exemplary embodiment of the present disclosure.

FIG. 11 is a block diagram showing the configuration of the phase difference calculation part 901. The phase difference calculation part 901 in FIG. 10 receives outputs of the phase rotation multipliers 201 relating to the pilot signals, has a phase comparator 1001 calculate information relating to the phase difference thereof, and outputs the first phase noise information $e^{jΔ}$=FPN after cutting the high frequency components with a low-pass filter 1002. The other aspects of the operation of the phase noise estimation part 101a in FIG. 10 are the same as those of the part shown in FIG. 3; therefore, the explanation will be omitted.

Figure 12:
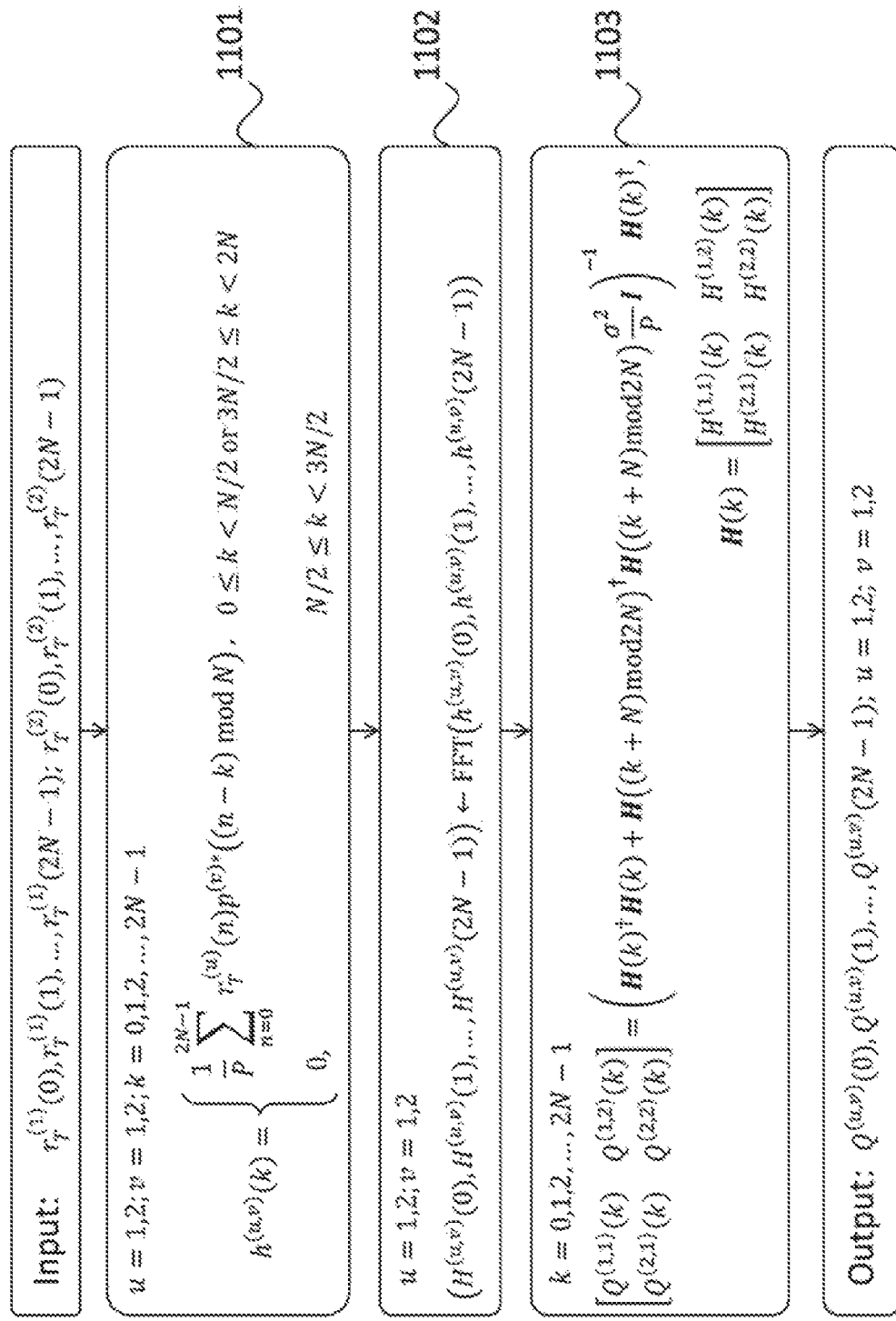
FIG. 12 is flowchart showing the operation of the second exemplary embodiment of the present disclosure.

FIG. 12 is a flowchart showing the procedure of a communication path state estimation method, the function of the communication path state estimation part 102 of the second exemplary embodiment. FIG. 12 relates to double-rate sampling frequency domain equalization in which received signals are sampled at twice the symbol rate (double sampling), and the basic operation is the same as the procedure of the communication path state estimation method shown in FIG. 9.

The training sequence transmitted from each transmit antenna is also the same, however, the corresponding received sequence has a length of 2N and is written as $r_T^{(u)}(0)$, $r_T^{(u)}(1)$, ..., $r_T^{(u)}(2N-1)$ (u denotes one or two). The double-sampling communication path state estimation part 102 calculates four sequences $h^{(u, v)}(0)$, $h^{(u, v)}(1)$, ..., $h^{(u, v)}(2N-1)$ (each of u and v denotes one or two) having the length 2N according to a calculation method shown in 1101 of the flowchart in FIG. 12. Out of sequences having the length 2N determined by convoluting the transmitted training signal sequences with the corresponding received signals, these are sequences obtained by masking half, an N number, of signal portions to zero. In other words, in the process described above, out of the signal sequences having the length 2N obtained by convoluting modulo N the signal sequence $p^{(v)*}$ comprised of the complex conjugate of a training signal having the length N transmitted from each of the transmit antennas with the received signal $r_T^{(u)}$ having the length 2N obtained by sampling the training signal as a transmitted signal to the LOS-MIMO transmission path at a double rate, the signal sequences having the length 2N obtained by masking a half thereof, an N number, of signals to zero are calculated (refer to 1101 in FIG. 12).

Next, as shown in 1102 of the flowchart in FIG. 12, the communication path state estimation part 102 performs a Fourier transform on each of the four sequences $h^{(u, v)}(0)$, $h^{(u, v)}(1)$, ..., $h^{(u, v)}(2N-1)$ having the length 2N, and calculates four sequences $H^{(u, v)}(0)$, $H^{(u, v)}(1)$, ..., $H^{(u, v)}(2N-1)$ having the length 2N.

Finally, the communication path state estimation part 102 calculates and outputs four sequences $Q^{(u, v)}(0)$, $Q^{(u, v)}(1)$, ..., $Q^{(u, v)}(2N-1)$ having the length 2N in a process shown in 1103 of the flowchart in FIG. 12. Note that the process shown in 1103 corresponds to means for calculating tap coefficients for frequency domain equalization that minimize the mean square error with H(k), k=0, 1, ..., 2N−1 as the frequency response of the LOS-MIMO transmission path. More concretely, the four sequences $Q^{(u, v)}(0)$, $Q^{(u, v)}(1)$, ..., $Q^{(u, v)}(2N-1)$ having the length 2N become the tap coefficients of the frequency domain equalizers 105.

As described, the present disclosure can be modified into a mode suitable for a case where the signal format of the signal frame includes a pilot signal for phase noise compensation.

Each exemplary embodiment of the present invention has been described, however, the present invention is not limited to these exemplary embodiments and further modifications, substitutions, and adjustments can be performed within the scope of the basic technological concept of the present invention. For instance, the network configuration, the configuration of each element, and the expression of each message shown in each drawing are examples to facilitate understanding of the present invention and are not limited to the configurations shown in the drawings.

For instance, in the examples of the exemplary embodiments, there are two each of the transmit antennas and the receive antennas, however, the numbers of transmit antennas and receive antennas may be three or more. In this case, the same number of phase-locked loops as the receive antennas should be provided, and by selecting two therefrom and making them the first and the second antennas in the exemplary embodiments described above, interference can be removed with the first and the second phase noise information.

Figure 13:
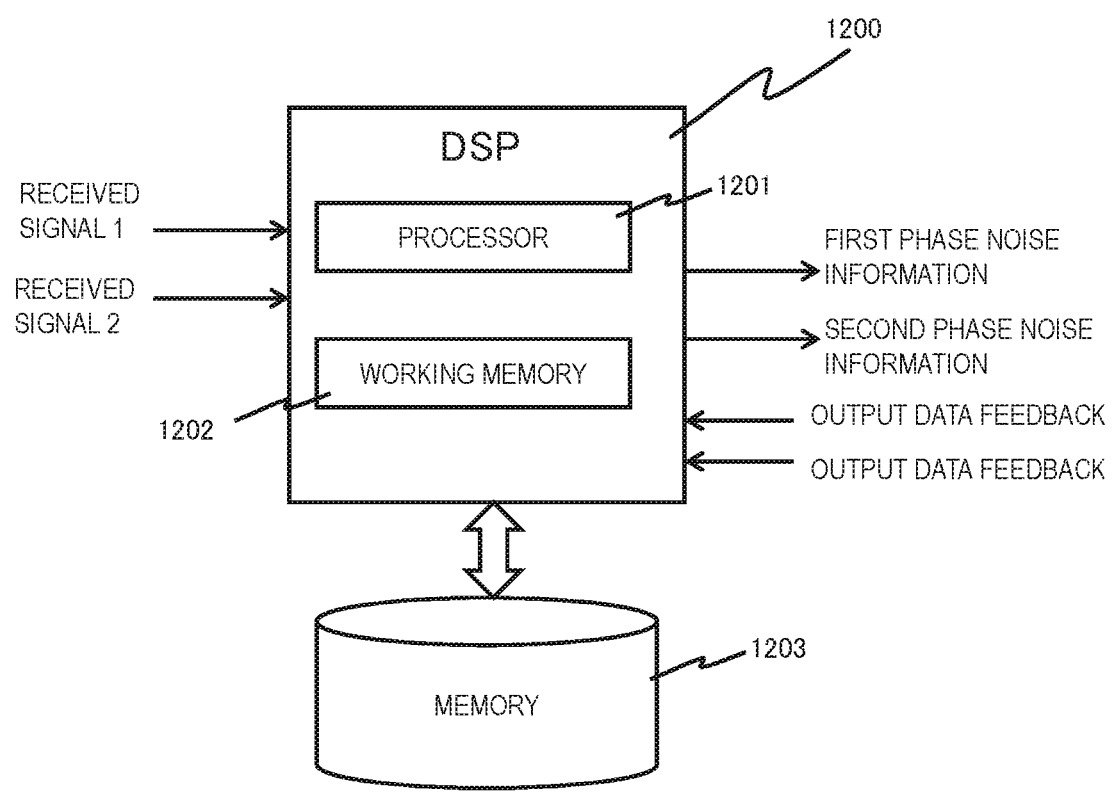
FIG. 13 is a drawing showing a modified exemplary embodiment of the LOS-MIMO demodulation apparatus of the present disclosure.

Further, each part (processing means) of the LOS-MIMO demodulation apparatus shown in each drawing can be realized by a computer program having a computer that constitutes the LOS-MIMO demodulation apparatus execute each processing described above using the hardware thereof. For instance, as shown in FIG. 13, the phase noise estimation part and the communication path state estimation part can be realized by a configuration including a DSP (Digital Signal Processor) 1200 that comprises a processor 1201 and a working memory 1202 and a memory 1203 that stores the program having the processor 1201 execute the processing described above. More specifically, the processor 1201 reads out the program corresponding to the processing performed by the phase noise estimation part and the communication path state estimation part from the memory 1203 and calculates and outputs the first and the second phase noise information on the basis of the received signals 1 and 2.

Finally, preferred modes of the present invention will be summarized.

[Mode 1]
(Refer to the LOS-MIMO demodulation apparatus according to the first aspect.)

[Mode 2]
In the LOS-MIMO demodulation apparatus according to Mode 1,
the phase noise estimation part comprises a phase difference calculation part that outputs as the first phase noise information a phase difference calculated from a pair of the received signals, or a pair of signals obtained by feeding the signals on which the frequency domain equalization processing has been performed to phase-locked loops.

[Mode 3]
In the LOS-MIMO demodulation apparatus according to Mode 1,
the first phase noise information satisfies the following equation when $\varphi_R^{(1)}$ and $\varphi_R^{(2)}$ denote phase noise associated with a first receive antenna and phase noise associated with a second receive antenna, respectively.

$$\text{The first phase noise information} = (\varphi_R^{(1)} - \varphi_R^{(2)})/2 \quad \text{[Math. 1]}$$

[Mode 4]
In the LOS-MIMO demodulation apparatus according to any one of Modes 1 to 3,
the phase noise estimation part comprises a phase-locked loop that receives a signal obtained by removing a MIMO interference component from a received signal and outputs the second phase noise information.

[Mode 5]
In the LOS-MIMO demodulation apparatus according to any one of Modes 1 to 3,
the second phase noise information satisfies the following equations when $\varphi_T^{(1)}$, $\varphi_T^{(2)}$ and $\varphi_R^{(1)}$, $\varphi_R^{(2)}$ denote phase noise associated with two transmit antennas and phase noise associated with two receive antennas, respectively.

$$\text{The second phase noise information}^{(1)} = \varphi_T^{(1)} + (\varphi_R^{(1)} + \varphi_R^{(2)})/2$$

$$\text{The second phase noise information}^{(2)} = \varphi_T^{(2)} + (\varphi_R^{(1)} + \varphi_R^{(2)})/2 \quad \text{[Math. 2]}$$

[Mode 6]
In the LOS-MIMO demodulation apparatus according to any one of Modes 1 to 5,
the phase noise estimation part comprises the same number of phase-locked loops as the receive antennas, the phase-locked loops calculating the second phase noise information, a phase difference calculation part that calculates first phase noise information from outputs of the phase-locked loops, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and calculates second phase noise information obtained by having the phase-locked loops add an average of phase noise on the reception side to phase noise on the transmission side after performing the weight and addition processing on each of the corrected received signals.

[Mode 7]
In the LOS-MIMO demodulation apparatus according to any one of Modes 1 to 5,
the phase noise estimation part comprises a phase difference calculation part that calculates the first phase noise information from the received signals, the same number of phase-locked loops as the receive antennas, the phase-locked loops calculating the second phase noise information, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and has the phase-locked loops calculate the second phase noise information after performing the weight and addition processing on each of the corrected received signals.

[Mode 8]
In the LOS-MIMO demodulation apparatus according to any one of Modes 1 to 7,
the communication path state estimation part comprises:
a part configured to calculate signal sequences having a length N obtained by masking a half, an N/2 number, of signals, out of signal sequences having the length N obtained by convoluting a signal sequence comprised of the complex conjugate of a training signal having the length N transmitted from each of the transmit antennas with a received signal having the length N obtained by sampling the training signal as a transmitted signal to the LOS-MIMO transmission path at the same rate, to zero;
a part configured to generate signals obtained by performing a Fourier transform on the signal sequences having the length N; and
a part configured to calculate tap coefficients for equal-rate sampling frequency equalization that minimize the mean square error with the signals on which a Fourier transform has been performed as the frequency response of the LOS-MIMO transmission path.

[Mode 9]

In the LOS-MIMO demodulation apparatus according to any one of Modes 1 to 7, the communication path state estimation part comprises:

a part configured to calculate signal sequences having a length 2N obtained by masking a half, an N number, of signals, out of signal sequences having the length 2N obtained by convoluting modulo N a signal sequence comprised of the complex conjugate of a training signal having the length N transmitted from each of the transmit antennas with a received signal having the length 2N obtained by sampling the training signal as a transmitted signal to the LOS-MIMO transmission path at a double rate, to zero;

a part configured to generate signals obtained by performing a Fourier transform on the signal sequences having the length 2N; and a part configured to calculate tap coefficients for double-rate sampling frequency equalization that minimize the mean square error with the signals on which a Fourier transform has been performed as the frequency response of the LOS-MIMO transmission path.

[Mode 10]

A line-of-sight multiple-input multiple-output (LOS-MIMO) demodulation apparatus used in a LOS-MIMO wireless communication system that uses a plurality of fixedly arranged transmit antennas and receive antennas and multiplexes a transmission path utilizing a difference in transmission delay adjusted by the distance between the antennas, and estimating transmitted data from a signal received by each of the plurality of received antennas, the LOS-MIMO demodulation apparatus comprising:

a frequency domain equalization part that compensates for distortion due to interference from each signal received by the plurality of receive antennas; a communication path state estimation part that calculates tap coefficients for the frequency domain equalization; and a phase noise estimation part that calculates, from each signal received by the plurality of receive antennas, first phase noise information and second phase noise information relating to phase noise occurring at the transmit antennas and the receive antennas, correcting a phase of each signal received by the plurality of receive antennas according to the first phase noise information, performing frequency domain equalization processing by converting each of the corrected received signals into the frequency domain by means of a discrete Fourier transform of length N, and then correcting, according to the second phase noise information, a phase of each signal obtained by returning the signals, on which the frequency domain equalization processing has been performed, to the time domain by performing an inverse discrete Fourier transform of length N.

[Mode 11]

(Refer to the communication apparatus according to the second aspect.)

[Mode 12]

(Refer to the LOS-MIMO transmission system according to the third aspect.)

[Mode 13]

(Refer to the LOS-MIMO demodulation method according to the fourth aspect.)

[Mode 14]

(Refer to the program according to the fifth aspect.)

Further, Modes 11 to 14 can be developed or modified into Modes 2 to 10 as Mode 1.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a numeric value or small range example included in these ranges even in cases where no explanation is provided.

What is claimed is:

1. A line-of-sight multiple-input multiple-output (LOS-MIMO) demodulation apparatus comprising:

a plurality of receive antennas that receive data transmitted with LOS-MIMO;

a phase noise estimation part that calculates, from each signal received by the plurality of receive antennas, first phase noise information and second phase noise information relating to phase noise occurring at transmit antennas and the receive antennas;

a first correction part that corrects a phase of each signal received by the plurality of receive antennas according to the first phase noise information;

a frequency domain equalization part that performs frequency domain equalization processing compensating for distortion due to interference from each signal received by the plurality of receive antennas on the corrected received signal;

a second correction part that corrects, according to the second phase noise information, a phase of each signal obtained by returning the signals, on which the frequency domain equalization processing has been performed, to the time domain by performing an inverse discrete Fourier transform; and a decoding processing part that performs decoding processing on the corrected data.

2. The LOS-MIMO demodulation apparatus according to claim 1, wherein the phase noise estimation part comprises a phase difference calculation part that outputs as the first phase noise information a phase difference calculated from a pair of the received signals, or a pair of signals obtained by feeding the signals on which the frequency domain equalization processing has been performed to phase-locked loops.

3. The LOS-MIMO demodulation apparatus according to claim 2, wherein the phase noise estimation part comprises a phase-locked loop that receives a signal obtained by removing a MIMO interference component from a received signal and outputs the second phase noise information.

4. The LOS-MIMO demodulation apparatus according to claim 2, wherein the second phase noise information satisfies the following equations when $\varphi_T^{(1)}$, $\varphi_T^{(2)}$ and $\varphi_R^{(1)}$, $\varphi_R^{(2)}$ denote phase noise associated with two transmit antennas and phase noise associated with two receive antennas, respectively $$\text{The second phase noise information}^{(1)} = \varphi_T^{(1)} + (\varphi_R^{(1)} + \varphi_R^{(2)})/2$$

$$\text{The second phase noise information}^{(2)} = \varphi_T^{(2)} + (\varphi_R^{(1)} + \varphi_R^{(2)})/2 \quad \text{[Math. 2]}$$

5. The LOS-MIMO demodulation apparatus according to claim 2, wherein
the phase noise estimation part comprises the same number of phase-locked loops as the receive antennas, the phase-locked loops calculating the second phase noise information, a phase difference calculation part that calculates first phase noise information from outputs of the phase-locked loops, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and calculates second phase noise information obtained by having the phase-locked loops add an average of phase noise on the reception side to phase noise on the transmission side after performing the weight and addition processing on each of the corrected received signals.

6. The LOS-MIMO demodulation apparatus according to claim 1, wherein
the first phase noise information satisfies the following equation when $\varphi_R^{(1)}$ and $\varphi_R^{(2)}$ denote phase noise associated with a first receive antenna and phase noise associated with a second receive antenna, respectively $$\text{The first phase noise information} = (\varphi_R^{(1)} - \varphi_R^{(2)})/2 \qquad [\text{Math. 1}]$$

7. The LOS-MIMO demodulation apparatus according to claim 6, wherein
the phase noise estimation part comprises a phase-locked loop that receives a signal obtained by removing a MIMO interference component from a received signal and outputs the second phase noise information.

8. The LOS-MIMO demodulation apparatus according to claim 6, wherein
the second phase noise information satisfies the following equations when $\varphi_T^{(1)}$, $\varphi_T^{(2)}$ and $\varphi_R^{(1)}$, $\varphi_R^{(2)}$ denote phase noise associated with two transmit antennas and phase noise associated with two receive antennas, respectively $$\text{The second phase noise information}^{(1)} = \varphi_T^{(1)} + (\varphi_R^{(1)} + \varphi_R^{(2)})/2$$

$$\text{The second phase noise information}^{(2)} = \varphi_T^{(2)} + (\varphi_R^{(1)} + \varphi_R^{(2)})/2 \qquad [\text{Math. 2}]$$

9. The LOS-MIMO demodulation apparatus according to claim 6, wherein
the phase noise estimation part comprises the same number of phase-locked loops as the receive antennas, the phase-locked loops calculating the second phase noise information, a phase difference calculation part that calculates first phase noise information from outputs of the phase-locked loops, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and calculates second phase noise information obtained by having the phase-locked loops add an average of phase noise on the reception side to phase noise on the transmission side after performing the weight and addition processing on each of the corrected received signals.

10. The LOS-MIMO demodulation apparatus according to claim 1, wherein
the phase noise estimation part comprises a phase-locked loop that receives a signal obtained by removing a MIMO interference component from a received signal and outputs the second phase noise information.

11. The LOS-MIMO demodulation apparatus according to claim 1, wherein
the second phase noise information satisfies the following equations when $\varphi_T^{(1)}$, $\varphi_T^{(2)}$ and $\varphi_R^{(1)}$, $\varphi_R^{(2)}$ denote phase noise associated with two transmit antennas and phase noise associated with two receive antennas, respectively $$\text{The second phase noise information}^{(1)} = \varphi_T^{(1)} + (\varphi_R^{(1)} + \varphi_R^{(2)})/2$$

$$\text{The second phase noise information}^{(2)} = \varphi_T^{(2)} + (\varphi_R^{(1)} + \varphi_R^{(2)})/2 \qquad [\text{Math. 2}]$$

12. The LOS-MIMO demodulation apparatus according to claim 1, wherein
the phase noise estimation part comprises the same number of phase-locked loops as the receive antennas, the phase-locked loops calculating the second phase noise information, a phase difference calculation part that calculates first phase noise information from outputs of the phase-locked loops, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and calculates second phase noise information obtained by having the phase-locked loops add an average of phase noise on the reception side to phase noise on the transmission side after performing the weight and addition processing on each of the corrected received signals.

13. The LOS-MIMO demodulation apparatus according to claim 1, wherein
the phase noise estimation part comprises a phase difference calculation part that calculates the first phase noise information from the received signals, the same number of phase-locked loops as the receive antennas, the phase-locked loops calculating the second phase noise information, and a multiplier, an adder, and a multiplication coefficient generation part that weight and add the received signals, and
the phase noise estimation part corrects a phase of each signal received by the plurality of receive antennas with the first phase noise information that is an output of the phase difference calculation part, and has the phase-locked loops calculate the second phase noise information after performing the weight and addition processing on each of the corrected received signals.

14. The LOS-MIMO demodulation apparatus according to claim 1, comprising:
a part configured to calculate signal sequences having a length N obtained by masking a half, an N/2 number, of signals, out of signal sequences having the length N obtained by convoluting a signal sequence comprised of the complex conjugate of a training signal having the length N transmitted from each of the transmit antennas with a received signal having the length N obtained by sampling the training signal as a transmitted signal to a LOS-MIMO transmission path at the same rate, to zero as a communication path state estimation part;
a part configured to generate signals obtained by performing a Fourier transform on the signal sequences having the length N; and a part configured to calculate tap coefficients for equal-rate sampling frequency equalization that minimize the mean square error with the signals on which a Fourier transform has been performed as the frequency response of the LOS-MIMO transmission path.

15. The LOS-MIMO demodulation apparatus according to claim 1, comprising:
a part configured to calculate signal sequences having a length 2N obtained by masking a half, an N number, of signals, out of signal sequences having the length 2N obtained by convoluting modulo N a signal sequence comprised of the complex conjugate of a training signal having the length N transmitted from each of the transmit antennas with a received signal having the length 2N obtained by sampling the training signal as a transmitted signal to the LOS-MIMO transmission path at a double rate, to zero as a communication path state estimation part;
a part configured to generate signals obtained by performing a Fourier transform on the signal sequences having the length 2N; and
a part configured to calculate tap coefficients for double-rate sampling frequency equalization that minimize the mean square error with the signals on which a Fourier transform has been performed as the frequency response of the LOS-MIMO transmission path.

16. A communication apparatus including the LOS-MIMO demodulation apparatus according to claim 1.

17. A LOS-MIMO transmission system including the LOS-MIMO demodulation apparatus according to claim 1, using a plurality of fixedly arranged transmit antennas and receive antennas, and multiplexing a transmission path utilizing a difference in transmission delay adjusted by the distance between the antennas.

18. The LOS-MIMO transmission system according to claim 17 comprising a function of feeding the second phase noise information calculated by the LOS-MIMO demodulation apparatus back to the transmission side, and
having the transmission side transmit each of signals transmitted from the plurality of transmit antennas after having performed phase rotation processing on the signals using the second phase noise information.

19. A line-of-sight multiple-input multiple-output (LOS-MIMO) demodulation apparatus used in a LOS-MIMO wireless communication system that uses a plurality of fixedly arranged transmit antennas and receive antennas and multiplexes a transmission path utilizing a difference in transmission delay adjusted by the distance between the antennas, and estimating transmitted data from a signal received by each of the plurality of received antennas, the LOS-MIMO demodulation apparatus comprising:
a frequency domain equalization part that compensates for distortion due to interference from each signal received by the plurality of receive antennas; a communication path state estimation part that calculates tap coefficients for the frequency domain equalization; and
a phase noise estimation part that calculates, from each signal received by the plurality of receive antennas, first phase noise information and second phase noise information relating to phase noise occurring at the transmit antennas and the receive antennas,
correcting a phase of each signal received by the plurality of receive antennas according to the first phase noise information, performing frequency domain equalization processing by converting each of the corrected received signals into the frequency domain by means of a discrete Fourier transform of length N, and then correcting, according to the second phase noise information, a phase of each signal obtained by returning the signals, on which the frequency domain equalization processing has been performed, to the time domain by performing an inverse discrete Fourier transform of length N.

20. A line-of-sight multiple-input multiple-output (LOS-MIMO) demodulation method including:
calculating, from each signal received by a plurality of receive antennas of a LOS-MIMO demodulation apparatus constituting LOS-MIMO, first phase noise information and second phase noise information relating to phase noise occurring at transmit antennas and the receive antennas;
correcting a phase of each signal received by the plurality of receive antennas according to the first phase noise information;
performing frequency domain equalization processing compensating for distortion due to interference from each signal received by the plurality of receive antennas on the corrected received signal; and
correcting, according to the second phase noise information, a phase of each signal obtained by returning the signals, on which the frequency domain equalization processing has been performed, to the time domain by performing an inverse discrete Fourier transform.

* * * * *